(12) United States Patent
Rietschin et al.

(10) Patent No.: US 11,995,449 B2
(45) Date of Patent: *May 28, 2024

(54) LAYERED COMPOSITE BOOT DEVICE AND FILE SYSTEM FOR OPERATING SYSTEM BOOTING IN FILE SYSTEM VIRTUALIZATION ENVIRONMENTS

(71) Applicant: Microsoft Technology Licensing, LLC, Redmond, WA (US)

(72) Inventors: Axel Rietschin, Sammamish, WA (US); Margarit Simeonov Chenchev, Sammamish, WA (US); Frederick J. Smith, IV, Coeur d' Alene, ID (US); Benjamin M. Schultz, Bellevue, WA (US); Hari R. Pulapaka, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,356

(22) Filed: Apr. 19, 2022

(65) Prior Publication Data
US 2022/0334848 A1    Oct. 20, 2022

Related U.S. Application Data

(63) Continuation of application No. 16/716,467, filed on Dec. 16, 2019, now Pat. No. 11,334,364.

(51) Int. Cl.
*G06F 9/4401* (2018.01)
*G06F 9/445* (2018.01)
(Continued)

(52) U.S. Cl.
CPC ........ *G06F 9/4408* (2013.01); *G06F 9/44505* (2013.01); *G06F 16/162* (2019.01);
(Continued)

(58) Field of Classification Search
CPC ......... G06F 16/164; G06F 2009/45579; G06F 9/4408; G06F 9/44505; G06F 9/45558
See application file for complete search history.

(56) References Cited

U.S. PATENT DOCUMENTS 6,061,743 A    5/2000    Thatcher et al.
6,950,964 B1    9/2005    Mcmichael et al.
(Continued)

FOREIGN PATENT DOCUMENTS

CN    101551756 A    10/2009
CN    111078367 A    4/2020
(Continued)

OTHER PUBLICATIONS

"Non Final Office Action Issued in U.S. Appl. No. 17/084,238", dated Oct. 27, 2022, 32 Pages.
(Continued)

*Primary Examiner* — Vincent H Tran

(57) ABSTRACT

A layered composite boot device, and a corresponding layered composite file system, can be implemented by a boot manager. Requests directed to the layered composite boot device and file system, can be serviced from a primary device and file system that are encapsulated by the layered composite boot device and file system. The primary device and file system can correspond to a virtualized file system within a container environment, thereby enabling changes within the container environment to affect early stages of operating system booting in the container environment. Should such requests not be serviceable from the primary layers, the composite device and file system can comprise secondary layers that can correspond to a container host connection and the host file system, providing fallback to
(Continued)

existing data if changes within the container environment were not made, thereby enabling booting to proceed in a traditional manner.

20 Claims, 11 Drawing Sheets

(51) Int. Cl.
 *G06F 16/16* (2019.01)
 *G06F 16/188* (2019.01)
 *G06F 21/53* (2013.01)

(52) U.S. Cl.
 CPC .......... *G06F 16/164* (2019.01); *G06F 16/188* (2019.01); *G06F 21/53* (2013.01)

(56) References Cited

U.S. PATENT DOCUMENTS

| | | | |
|---|---|---|---|
| 7,028,158 | B1 | 4/2006 | Beatty et al. |
| 7,496,565 | B2 | 2/2009 | Thind et al. |
| 7,584,219 | B2 | 9/2009 | Zybura et al. |
| 7,610,307 | B2 | 10/2009 | Havewala et al. |
| 7,783,677 | B2 | 8/2010 | Li et al. |
| 8,201,029 | B2 | 6/2012 | Jann et al. |
| 8,656,386 | B1 | 2/2014 | Tormasov et al. |
| 8,775,625 | B2 | 7/2014 | Narayanaswamy et al. |
| 8,874,888 | B1* | 10/2014 | Beda, III ............ G06F 9/45558 718/1 |
| 8,903,705 | B2 | 12/2014 | Howell et al. |
| 9,256,467 | B1 | 2/2016 | Singh et al. |
| 9,357,568 | B2 | 5/2016 | Al-Shalash et al. |
| 9,424,267 | B2 | 8/2016 | Bagal et al. |
| 9,451,044 | B2 | 9/2016 | Nord et al. |
| 9,542,408 | B2 | 1/2017 | Moss et al. |
| 9,606,629 | B2 | 3/2017 | Binyamin et al. |
| 9,729,579 | B1 | 8/2017 | Marino et al. |
| 9,766,915 | B1* | 9/2017 | Emelyanov ............. G06F 9/455 |
| 9,886,189 | B2 | 2/2018 | Zaveri et al. |
| 9,898,354 | B2 | 2/2018 | Engel et al. |
| 9,960,932 | B2 | 5/2018 | Constantinou |
| 9,965,151 | B2 | 5/2018 | Zaveri et al. |
| 9,971,977 | B2 | 5/2018 | Marti et al. |
| 10,061,613 | B1 | 8/2018 | Brooker et al. |
| 11,573,814 | B1* | 2/2023 | Aithal ................. H04L 41/5054 |
| 2002/0095479 | A1 | 7/2002 | Schmidt et al. |
| 2004/0017395 | A1 | 1/2004 | Cook |
| 2004/0181579 | A1 | 9/2004 | Huck et al. |
| 2004/0210893 | A1 | 10/2004 | Chamberlain et al. |
| 2005/0066059 | A1 | 3/2005 | Zybura et al. |
| 2005/0192984 | A1 | 9/2005 | Shenfield et al. |
| 2005/0198010 | A1 | 9/2005 | Borthakur et al. |
| 2005/0246723 | A1 | 11/2005 | Bhesania et al. |
| 2006/0010433 | A1 | 1/2006 | Neil et al. |
| 2006/0080656 | A1 | 4/2006 | Cain et al. |
| 2007/0130229 | A1 | 6/2007 | Anglin et al. |
| 2007/0233709 | A1 | 10/2007 | Abnous et al. |
| 2008/0046708 | A1 | 2/2008 | Fitzgerald et al. |
| 2008/0091702 | A1 | 4/2008 | Pudipeddi et al. |
| 2008/0154985 | A1 | 6/2008 | Childs et al. |
| 2008/0301676 | A1 | 12/2008 | Alpern et al. |
| 2009/0021513 | A1 | 1/2009 | Joshi et al. |
| 2009/0182778 | A1 | 7/2009 | Tormasov et al. |
| 2010/0036889 | A1 | 2/2010 | Joshi et al. |
| 2010/0043072 | A1 | 2/2010 | Rothwell |
| 2011/0040812 | A1 | 2/2011 | Phillips et al. |
| 2012/0005256 | A1 | 1/2012 | Cherukuri et al. |
| 2012/0180039 | A1 | 7/2012 | Bravery et al. |
| 2012/0233117 | A1 | 9/2012 | Holt et al. |
| 2012/0297181 | A1* | 11/2012 | Lee ......................... G06F 8/658 713/2 |
| 2013/0057934 | A1 | 3/2013 | Satomi et al. |
| 2013/0191643 | A1* | 7/2013 | Song ..................... H04L 9/3265 713/176 |
| 2013/0226931 | A1 | 8/2013 | Hazel |
| 2014/0006465 | A1 | 1/2014 | Davis et al. |
| 2014/0040331 | A1 | 2/2014 | Takaoka et al. |
| 2014/0095821 | A1 | 4/2014 | Yang et al. |
| 2014/0136865 | A1 | 5/2014 | Banerjee et al. |
| 2014/0157058 | A1 | 6/2014 | Bennah et al. |
| 2014/0280392 | A1 | 9/2014 | Christiansen et al. |
| 2014/0280397 | A1 | 9/2014 | Rajpal et al. |
| 2014/0304313 | A1 | 10/2014 | Choi |
| 2014/0324776 | A1 | 10/2014 | Novak et al. |
| 2016/0072889 | A1 | 3/2016 | Jung et al. |
| 2016/0314010 | A1* | 10/2016 | Haque ................. G06F 9/45558 |
| 2016/0335074 | A1 | 11/2016 | Olivier et al. |
| 2016/0378527 | A1 | 12/2016 | Zamir |
| 2017/0124345 | A1 | 5/2017 | Christiansen et al. |
| 2017/0168936 | A1 | 6/2017 | Chandrashekar et al. |
| 2017/0220598 | A1 | 8/2017 | Lu et al. |
| 2017/0235507 | A1 | 8/2017 | Sinha et al. |
| 2018/0129666 | A1 | 5/2018 | Havewala et al. |
| 2018/0246710 | A1 | 8/2018 | Kim et al. |
| 2018/0270124 | A1 | 9/2018 | Chugtu et al. |
| 2018/0307537 | A1* | 10/2018 | Chen ..................... G06F 16/128 |
| 2018/0336123 | A1* | 11/2018 | Benes ................. G06F 11/3692 |
| 2018/0341471 | A1* | 11/2018 | Stefanov ................... G06F 8/63 |
| 2018/0349150 | A1* | 12/2018 | Wong ..................... G06F 9/4493 |
| 2019/0042754 | A1* | 2/2019 | Jreij ...................... G06F 21/575 |
| 2019/0180003 | A1 | 6/2019 | Schultz et al. |
| 2019/0273655 | A1* | 9/2019 | Jones ................. H04L 41/0886 |
| 2019/0310872 | A1* | 10/2019 | Griffin ....................... G06F 8/71 |
| 2019/0354390 | A1 | 11/2019 | Gill et al. |
| 2020/0034449 | A1 | 1/2020 | Gupta |
| 2020/0150974 | A1* | 5/2020 | Li ........................ G06F 9/45558 |
| 2020/0334362 | A1 | 10/2020 | Stoler et al. |
| 2021/0011740 | A1 | 1/2021 | Lu et al. |
| 2021/0141760 | A1* | 5/2021 | Li ........................ G06F 16/156 |
| 2021/0382739 | A1 | 12/2021 | Guo et al. |
| 2022/0138146 | A1 | 5/2022 | Chagani et al. |

FOREIGN PATENT DOCUMENTS

| | | | |
|---|---|---|---|
| EP | 1845444 A1 | 10/2007 | |
| WO | 2010125473 A1 | 11/2010 | |
| WO | 2011022388 A1 | 2/2011 | |
| WO | WO-2014202403 A1 * | 12/2014 | ............ G06F 9/453 |
| WO | 2015088374 A1 | 6/2015 | |

OTHER PUBLICATIONS

"Final Office Action Issued in U.S. Appl. No. 17/084,238", dated May 11, 2023, 32 Pages.

"Docker and AUFS in Practice", Retrieved from: https://web.archive.org/web/20160305021439/https://docs.docker.com/engine/userguide/storagedriver/aufs-driver/, Mar. 5, 2016, 15 Pages.

"Docker and OverlayFS Storage in Practice", Retrieved From: https://web.archive.org/web/20160305024221/https://docs.docker.com/engine/userguide/storagedriver/overlayfs-driver/, Mar. 5, 2016, 17 Pages.

"Understand Images, Containers, and Storage Drivers", Retrieved from: https://web.archive.org/web/20161023201951/https://docs.docker.com/engine/userguide/storagedriver/imagesandcontainers/, May 23, 2017, 22 Pages.

"Understand the Architecture", Retrieved From: https://web.archive.org/web/20151107020152/http://docs.docker.com:80/engine/introduction/understanding-docker/, Nov. 7, 2015, 14 Pages.

"Final Office Action Issued in U.S. Appl. No. 15/074,273", Mailed Date: Jun. 18, 2018, 10 Pages.

"Non Final Office Action Issued in U.S. Appl. No. 15/074,273", Mailed Date: Dec. 27, 2017, 11 Pages.

"Notice of Allowance Issued in U.S. Appl. No. 15/074,273", Mailed Date: Aug. 15, 2018, 9 Pages.

"Final Office Action Issued in U.S. Appl. No. 15/076,277", Mailed Date: Apr. 20, 2017, 22 Pages.

"Non Final Office Action Issued in U.S. Appl. No. 15/076,277", Mailed Date: Oct. 6, 2016, 19 Pages.

"Notice of Allowance Issued in U.S. Appl. No. 15/076,277", Mailed Date: Oct. 20, 2017, 16 Pages.

(56) References Cited

OTHER PUBLICATIONS

"Final Office Action Issued in U.S. Appl. No. 15/629,301", Mailed Date: Oct. 2, 2019, 24 Pages.
"Non Final Office Action Issued in U.S. Appl. No. 15/629,301", Mailed Date: Jun. 23, 2020, 25 Pages.
"Non Final Office Action Issued in U.S. Appl. No. 15/629,301", Mailed Date: Jul. 1, 2019, 20 Pages.
"Final Office Action Issued in U.S. Appl. No. 16/893,288", Mailed Date : May 12, 2023, 35 Pages.
"Non Final Office Action Issued in U.S. Appl. No. 16/893,288", Mailed Date: Sep. 30, 2022, 33 Pages.
"Non Final Office Action Issued in U.S. Appl. No. 16/893,288", Mailed Date: Oct. 6, 2023, 39 Pages.
"Office Action Issued In European Patent Application No. 16801068. 4", Mailed Date: Oct. 29, 2019, 4 Pages.
"Office Action Issued In European Patent Application No. 17798048. 9", Mailed Date: Jun. 23, 2021, 8 Pages.
"Office Action and Search Report Issued in Chinese Patent Application No. 201680063205.1", Mailed Date: Jun. 24, 2021, 16 Pages.
"Office Action Issued in Chinese Patent Application No. 201680063205. 1", Mailed Date: Jun. 2, 2022, 10 Pages.
"Office Action Issued in Chinese Patent Application No. 201680063205. 1", Mailed Date: Mar. 2, 2022, 12 Pages.
Anderson, et al., "Global Namespace for Files", In IBM Systems Journal, vol. 43, Issue 4, Apr. 6, 2004, pp. 702-722.
Arredondo, J.R., "Rackspace Cloud Databases and Container-based Virtualization", Retrieved from: https://web.archive.org/web/20120901030519/http://c1776742.r42.cf0.rackcdn.com/downloads/pdfs/Rackspace-Cloud-Databases-and-Container-based-Virtualization. pdf, Aug. 2012, 6 Pages.
Choudhari, et al., "Docker-Run, Ship and building Applications", In International Journal of Latest Trends in Engineering and Technology, vol. 6, Issue 2, Nov. 2015, 7 Pages.
Felter, et al., "An Updated Performance Comparison of Virtual Machines and Linux Containers", Retrieved from: http://course.ece.cmu.edu/~ece845/docs/containers.pdf, Jul. 21, 2014, 12 Pages.
Hall, Susan, "Rise of the Container-Focused Operating Systems", Retrieved from: https://thenewstack.io/docker-fuels-rethinking-operating-system/, Jan. 27, 2016, 8 Pages.
Lu, et al., "Physical Disentanglement in a Container-Based File System", In Proceedings of the 11th USENIX Symposium on Operating Systems Design and Implementation, Oct. 6, 2014, 16 Pages.
Merkel, Dirk, "Docker: Lightweight Linux Containers for Consistent Development and Deployment", In Linux Journal, vol. 2014, Issue 239, Mar. 1, 2014, pp. 76-91.
"International Search Report and Written Opinion Issued in PCT Application No. PCT/US17/022227", Mailed Date: May 29, 2017, 11 Pages.
"International Preliminary Report on Patentability Issued in PCT Application No. PCT/US2016/058420", Mailed Date: Jan. 29, 2018, 7 Pages.
"International Search Report and Written Opinion Issued in PCT Application No. PCT/US2016/058420", Mailed Date: Feb. 22, 2017, 10 Pages.
"Second Written Opinion Issued in PCT Application No. PCT/US2016/058420", Mailed Date: Jul. 10, 2017, 6 Pages.
"International Search Report and Written Opinion Issued in PCT Application No. PCT/US2017/058922", Mailed date: Feb. 2, 2018, 12 Pages.
"International Search Report and Written Opinion Issued in PCT Application No. PCT/US2021/043812", Mailed Date: Nov. 4, 2021, 10 Pages.
"International Search Report and Written Opinion Issued in PCT Application No. PCT/US21/025841", Mailed Date: Sep. 13, 2021, 14 Pages.
"Invitation To Pay Additional Fees issued in PCT Application No. PCT/US21/025841", Mailed Date: Jul. 21, 2021, 9 Pages.
Porter, et al., "Rethinking the Library OS from the Top Down", In Proceedings of the Sixteenth International Conference on Architectural Support for Programming Languages and Operating Systems, Mar. 5, 2011, pp. 291-304.
Soltesz, et al., "Container-based Operating System Virtualization: A Scalable, High-performance Alternative to Hypervisors", In Proceedings of the 2nd ACM SIGOPS/EuroSys European Conference on Computer Systems, Mar. 21, 2007, 13 Pages.
Zhang, et al., "Harbormaster: Policy Enforcement for Containers", In Proceedings of IEEE 7th International Conference on Cloud Computing Technology and Science, Nov. 30, 2015, pp. 355-362.

* cited by examiner

LAYERED COMPOSITE BOOT DEVICE AND FILE SYSTEM FOR OPERATING SYSTEM BOOTING IN FILE SYSTEM VIRTUALIZATION ENVIRONMENTS

CROSS-REFERENCE TO RELATED APPLICATION

This application is a continuation of, and claims priority to, U.S. patent application Ser. No. 16/716,467, filed on Dec. 16, 2019, and entitled "A LAYERED COMPOSITE BOOT DEVICE AND FILE SYSTEM FOR OPERATING SYSTEM BOOTING IN FILE SYSTEM VIRTUALIZATION ENVIRONMENTS", the specification of which is hereby incorporated by reference in its entirety for all that it teaches and suggests.

BACKGROUND

Traditional virtual computing environments, commonly termed "virtual machines", virtualize most or all aspects of a computing environment, and can, thereby, present computing environments that are very different from the host computing device hardware and operating system. Such virtual machine computing environments can virtualize the computing hardware itself. However, traditional virtual computing environments, because of the need to virtualize most or all aspects of the host computing environment, can consume large quantities of memory, require extensive processing resources, and can otherwise be inefficient. In some instances, lightweight virtual computing environments, often termed "containers", can provide many of the isolation benefits of traditional virtual computing environments in a more efficient manner, such as by utilizing aspects of the host computing device hardware and operating system, instead of virtualizing those aspects of the computing environment. Such container virtual computing environments can virtualize, not the computing hardware, but rather just the file system, presenting a different, isolated view of file data. As such, containers can be utilized to provide isolated computing environment, such as to limit the impact of potentially malicious instructions, provide virgin computing environment, such as for testing or troubleshooting purposes, and other like benefits.

Unfortunately, because the file system virtualization provided by container virtual computing environments is provided by file system drivers, filter drivers, mini-drivers or other like computer-executable instructions instantiated after the booting of an operating system kernel, processes executing within the container environment cannot change the early stages of the operating system boot within the container environment, rendering such container environments unusable for many functions for which the isolation provided by such container environments would be particularly useful. For example, container environments cannot be utilized to develop, test and evaluate anti-malware software because anti-malware software typically requires the execution of computer-executable instructions during an early stage of an operating system boot. While the anti-malware software executing within the container environment could make such changes, the changes would be persisted within the container file system, which would not be accessible until after the kernel of the operating system had already booted and then instantiated the necessary file system drivers. As such, the changes made by the anti-malware software, as an example, would need to be available at an earlier point in time than existing container file system virtualization environments enable. The inability to persist changes affecting early stages of an operating system boot within container file system virtualization environments negatively impacts the usability of such container file system virtualization environments.

SUMMARY

A layered composite boot device, and a corresponding layered composite file system, can be implemented by computer-executable instructions that can be part of a boot manager, thereby providing access to virtualized container file systems at an earlier stage during an operating system boot in a container file system virtualization environment. Requests directed to the layered composite boot device, and the layered composite file system, can be serviced from a primary device, and primary file system, encapsulated by the layered composite boot device, and layered composite file system, respectively. Such a primary device, and primary file system, can correspond to a virtualized file system within a container environment, thereby enabling changes within the container environment to affect early stages of an operating system boot in such a container environment. Should such requests not be serviceable from the primary layers, the composite device and composite file system can comprise secondary layers, such as a secondary device that can correspond to a container host connection to the host computing environment, and a secondary file system that can correspond to the host file system, providing fallback to existing data if changes within the container environment were not made, and thereby enabling the operating system boot in the container environment to proceed in a traditional manner.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
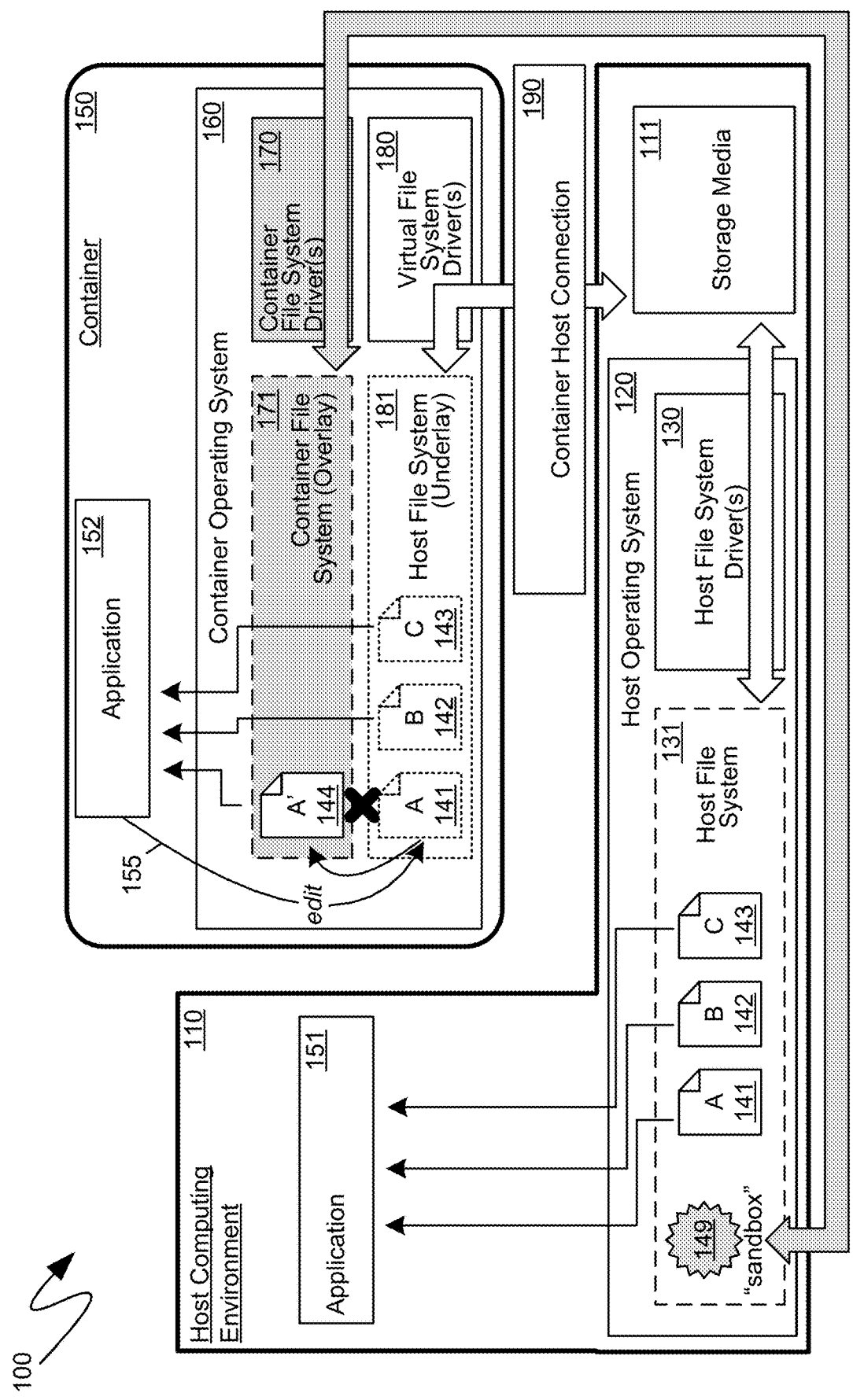
FIG. 1 is a system diagram of an exemplary file system virtualization environment.

The following description relates to a layered composite boot device, and a corresponding layered composite file system, that can be implemented by computer-executable instructions that can be part of a boot manager, thereby providing access to virtualized container file systems at an earlier stage during an operating system boot in a container file system virtualization environment. Requests directed to the layered composite boot device, and the layered composite file system, can be serviced from a primary device, and primary file system, encapsulated by the layered composite boot device, and layered composite file system, respectively. Such a primary device, and primary file system, can correspond to a virtualized file system within a container environment, thereby enabling changes within the container environment to affect early stages of an operating system boot in such a container environment. Should such requests not be serviceable from the primary layers, the composite device and composite file system can comprise secondary layers, such as a secondary device that can correspond to a container host connection to the host computing environment, and a secondary file system that can correspond to the host file system, providing fallback to existing data if changes within the container environment were not made, and thereby enabling the operating system boot in the container environment to proceed in a traditional manner.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environment where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 comprises an exemplary host computing environment 110, which, for purposes of providing context for the descriptions below, can host a file system virtualization environment in the form of the exemplary container 150. As utilized herein, the term "file system virtualization environment" means a virtualized computing environment that does not virtualize the underlying computing hardware or devices, but rather virtualizes the file system, thereby enabling isolation from the host computing device such that file-level changes made within the file system virtualization environment do not impact the host computing device's file system.

More specifically, and as illustrated by the exemplary system 100 of FIG. 1, the exemplary host computing environment 110 can have executing thereon a host operating system, such as in the form of the exemplary host operating system 120. As part of the host operating system 120, one or more file system drivers, filters, mini-filters, and other like file system components, generally illustrated in FIG. 1 as the host file system drivers 130, can obtain data in structured form from one or more storage media, such as the exemplary storage media 111, and can parse such data into file constructs that can be presented to applications and other processes executing on the host operating system 120. For example, an application 151, executing on the host computing environment 110 can be presented with multiple files, such as the exemplary files 141, 142 and 143, as part of the host file system 131. Analogously, a container operating system, such as the exemplary container operating system 160, can execute within the exemplary container 150. To provide for file system virtualization, however, the exemplary container operating system 160 can present different files then the host file system 131.

According to one aspect, the file system of the exemplary container operating system 160 can be a layered file system that can enable applications executing within the container environment 150, such as the exemplary application 152, to access some or all of the same files of the host file system 131, such as, for example, the exemplary files 141, 142 and 143, except that any changes or modifications to those files can remain only within the container environment 150. For example, as illustrated by the exemplary system 100 of FIG. 1, the exemplary container operating system 160 can comprise a layered file system in the form of the container file system 171, which can act as a primary layer, or "overlay", in combination with the host file system 181, which can act as a secondary layer, or "underlay".

The file systems referenced herein can be any of the known, existing file systems, such as the NT file system (NTFS), the Apple file system (APFS), the UNIX file system (UFS), and the like, or other file systems. Similarly, the file system drivers can be the corresponding drivers, filters, mini-filters, and other like drivers that can implement such file systems. Thus, for example, if the host file system 131 is NTFS, then the host file system drivers 130 can be the relevant NTFS drivers. Within the exemplary container environment 150, however, the host file system 181 can be implemented in a slightly different manner so as to provide access to the host file system from within a file system virtualization environment. More specifically, according to one aspect, access to the host computing environment 110, from within the container environment 150, can be through a container host connection, such as the exemplary container host connection 190. According to one aspect, the exemplary container host connection 190 can be in the form of a virtualized network connection which can simulate the container environment 150 being a separate computing device from the host computing environment 110, and the two computing devices being communicationally coupled via a network. Other container host connections can be based on other communication protocols, such as peripheral interconnection protocols and the like. According to one aspect, the container host connection 190 can appear as a block data device from within the container environment 150. Accordingly, the host file system 181, from within the container environment 150, can be implemented as a network file system, for example, and, accordingly, the drivers 180, which can include drivers, filters, mini-filters and other like constructs, can implement such a network file system by communicating, through the container host connection 190, with the host computing environment 110. The host computing environment 110 can also comprise a file system having a same type as the host file system 131. For example, if the host file system 131 is NTFS, the container file system 171 can also be NTFS. In such an instance, the container file system drivers 170 can comprise analogous drivers, filters, mini-filters and other like constructs to those of the host file system drivers 130. Indeed, the same codebase, or even the same compiled binaries, can be utilized to implement both the container file system drivers 170 and the host file system drivers 130.

According to one aspect, changes to files within the file system virtualization environment presented by the container 150 can be isolated from other file system virtualization environments and from the host computing environment 110 itself. For example, if the exemplary application 152, executing within the container environment 150, were to edit the exemplary file 141, as illustrated by the edit action 155, such a modification can result in a file 144, representing an edited version of the file 141, being part of the container file system 171. The original file 141 would be unchanged. However, from within the container environment 150, the layered file system would present the edited file 144 instead of the original file 141 from the host file system. Colloquially, the edited file 144 would "block" or "mask" the presentation of the original file 141. If the exemplary application 152 did not edit the files 142 or 143, those files would still "pass through" the overlay file system and be presented to applications or processes executing within the container 150, such as the exemplary application 152.

The digital data representing edited file 144 can be stored in a sandbox, such as the exemplary sandbox 149, which can be accessed by the container file system drivers 170, described previously, in order to generate the container file system 171. As utilized herein, the term "sandbox" means one or more files, databases, structured storage, or other like digital data repository that can store the relevant data necessary to implement the container file system 171. For example, the sandbox 149 can be a file, or a package, within the host file system 131. In such a manner, the host computing environment 110 can remain isolated from edits performed within the container environment 150. Thus, for example, if the edit 155 was a malicious action, the file 141 in the host computing environment 110 would remain isolated from, and unaffected by, such an action within the container environment 150.

As indicated, in some instances, it can be desirable to allow processes executing within the container environment 150 to modify aspects of the container operating system 160, including aspects that can be established during early portions of the boot process of the container operating system 160. However, the layered file system presented by the container operating system 160 can be established at a much later point during the boot process of the container operating system 160. For example, the container file system drivers 170 and virtual file system drivers 180 may not establish the layered file systems 171 and 181 until after the kernel of the container operating system 160 has executed. Indeed, in some instances, the kernel of the operating system 160 can be responsible for executing the relevant drivers 170 and 180. Accordingly, if, for example, an application or process executing within the container 150 changed an aspect of the container operating system 160, such a change could be stored in the container file system 171, such as in the manner detailed previously. However, since the container file system 171 may not be accessible until after the kernel of the operating system 160 has executed the relevant drivers 170, the operating system 160 will not be able to access such a change early in its boot process, since such a change will not be accessible until after the operating system kernel has already been loaded into memory. Accordingly, not having access to the container file system 171, early portions of the booting of the container operating system 160 can only utilize data from the host computing device, which, as indicated previously, is unaffected by, and isolated from, changes made within the container environment 150.

Figure 2A:
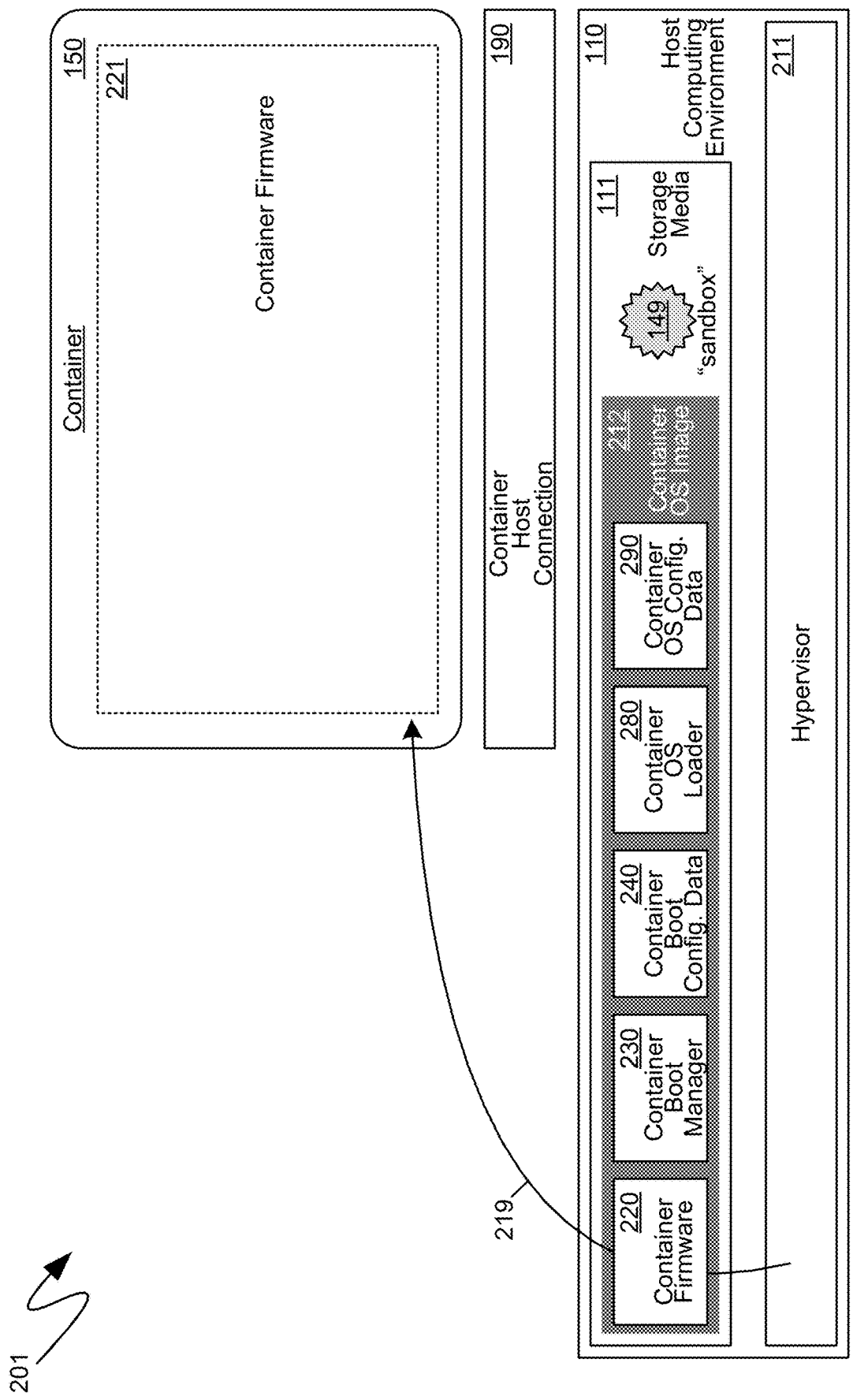
FIGS. 2a-2f are system diagrams of exemplary operating system booting in a file system virtualization environment utilizing a layered composite boot device and file system.

To enable processes executing within the container environment 150 to modify aspects of the container operating system 160, including aspects that can be established during the early portions of the boot process of the container operating system 160, a layered composite boot device and file system can be utilized during the booting of the container operating system 160. Turning to FIG. 2a, the exemplary system 201 shown therein illustrates an exemplary initiation of a booting of an operating system in a container file system virtualization environment, such as the exemplary container 150. More specifically, the exemplary host computing environment 110 can comprise a hypervisor, such as the exemplary hypervisor 211, or other like hardware and/or software capabilities. The exemplary hypervisor 211 can utilize data from a container operating system image, such as the exemplary container operating system image 212, or other like container data stored on the storage media 111 of the exemplary host computing environment 110, to start booting an operating system within the exemplary container 150. For example, as illustrated by the exemplary system 201, the hypervisor 211 can cause container firmware 220 to execute within the container environment 150, in the form of the executing container firmware 221, as illustrated by the action 219. The information and executable instructions stored in a container operating system image, such as the exemplary container operating system image 212, can be static, such that they are not affected by changes to the host computing environment 110, or they can be dynamic in that changes to the host computing environment 110 can result in changes to some or all of the container operating system image 212. A dynamic container operating system image 212, for example, can utilize the same executable instructions for some or all of the relevant portions of the container operating system image 212 as are utilized to boot the operating system of the host computing device 110 itself. In such an instance, changes to the executable instructions that boot the operating system of the host computing device 110 can necessarily result in changes to the container operating system image 212.

As indicated previously, a virtualized network connection, such as the exemplary container host connection 190, can be utilized for processes executing within the container 150 to access information from the host computing environment 110. Accordingly, one aspect of the execution of the container firmware 221 within the container 150 can be the execution of drivers for the relevant devices that the container 150 may need to access during the boot process, such as graphics drivers, user input device drivers, such as keyboard drivers and mouse drivers, and, of relevance to the descriptions provided herein, network drivers that can enable the executing firmware 221 to access information from the host computing environment 110.

Figure 2B:
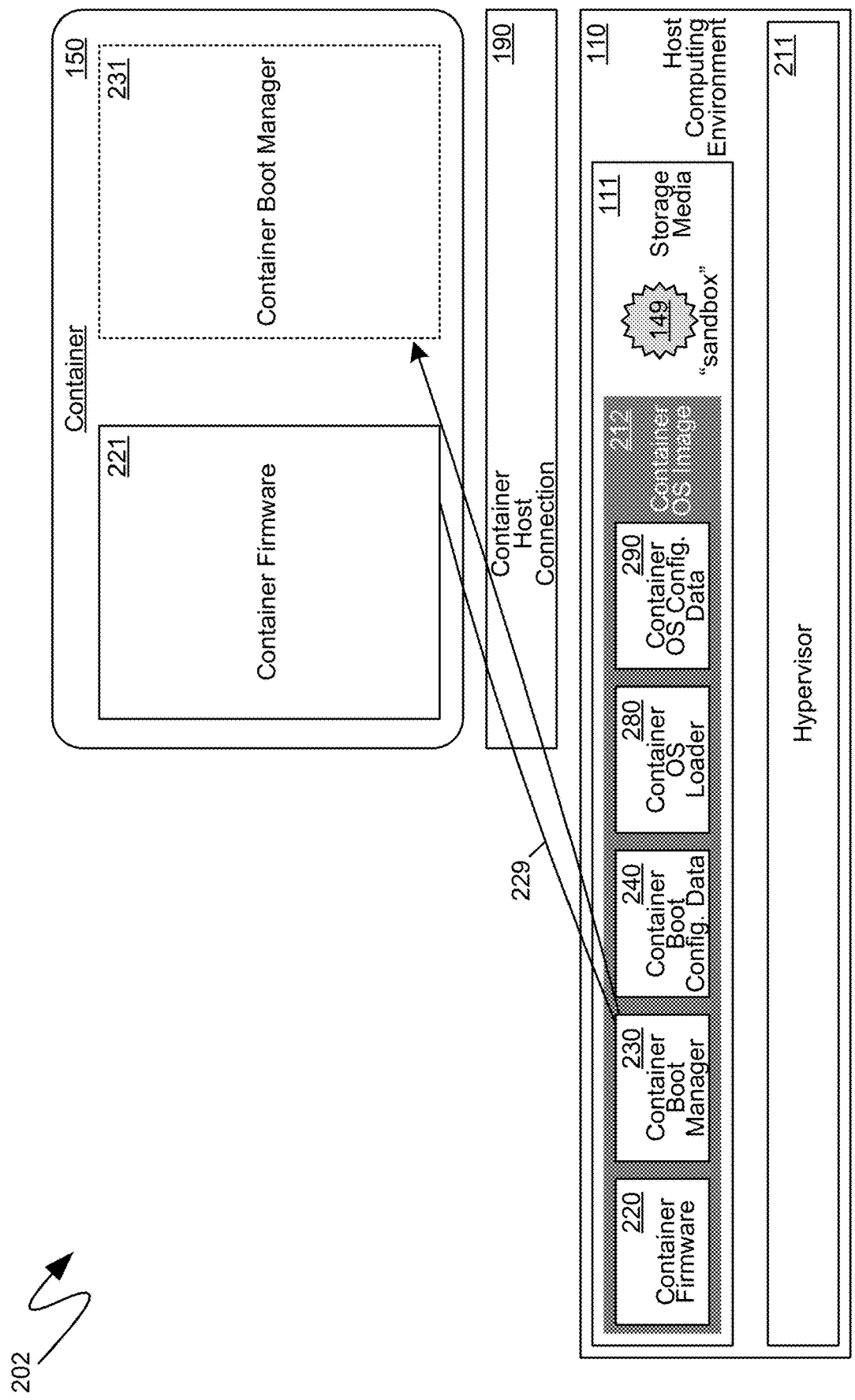

Turning to FIG. 2b, the exemplary system 202 shown therein illustrates the execution of the container firmware 221 utilizing the container host connection 190 to access the container boot manager 230 as stored on the storage media 111 of the host computing environment 110. As illustrated, the exemplary container boot manager 230 can be part of the exemplary container operating system image 212. The location of the exemplary container boot manager 230 can be identified, to the firmware 221, by the hypervisor 211 as part of the action 219 illustrated in FIG. 2a. Once accessed, the container boot manager 230 can be executed within the container, as the executing container boot manager 231, by the container firmware 221. The location and execution of the container boot manager 230, by the firmware 221, is illustrated in the exemplary system 202 by the action 229.

Like the firmware 221, the execution of the container boot manager 231 can include the execution of drivers, or other like computer-executable instructions, that can enable the container boot manager 231 to access relevant portions of the host operating system environment 110, including, for example, graphics drivers, input peripheral drivers, network drivers, and the like. Such drivers can be the same drivers as utilized by the container firmware 221, and, thus, such drivers can remain in memory for utilization by the container boot manager 231, or the drivers can be different drivers, which can require the container boot manager 231 to clear the memory previously utilized by the container firmware 221, and load its own drivers into the memory of the container environment 150.

Figure 2C:
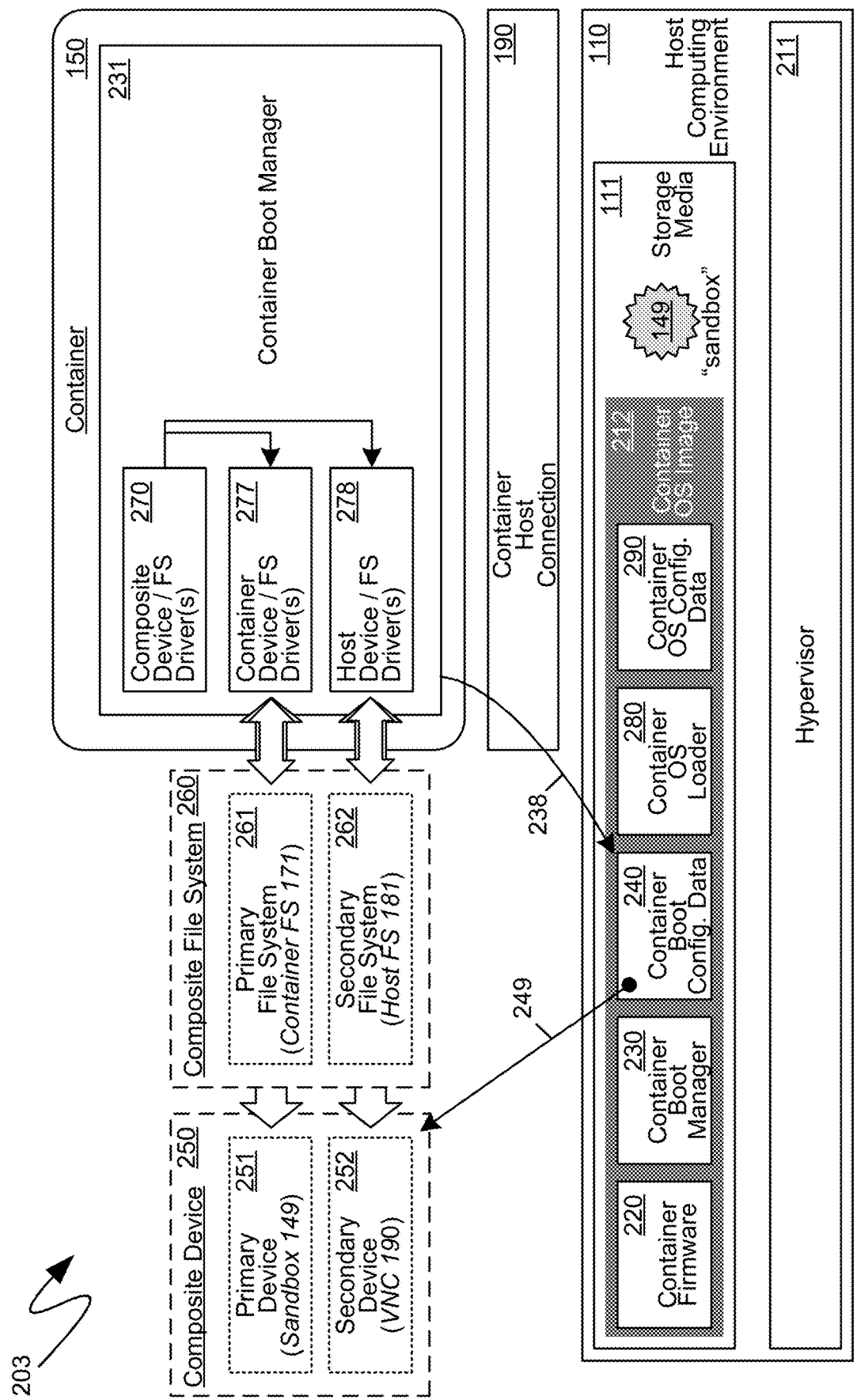

As part of the action 229, the firmware 221 can identify, to the container boot manager 231, a boot device to be utilized for the booting of an operating system into the container environment 150. In the system 202 illustrated in FIG. 2b, such a boot device can be the container host connection 190. Subsequently, the container boot manager 230 can access such a boot device to locate and obtain container boot configuration data. Turning to FIG. 2c, the exemplary system 203 illustrates an action 238 by which the container boot manager 231, executing within the container environment 150, utilizes the container host connection 190, that was previously specified, to the container boot manager 231, as the boot device, to locate and read the container boot configuration data 240. As illustrated, the container boot configuration data 240 can also be part of the exemplary container operating system image 212.

According to one aspect, to facilitate the utilization of modifications occurring within the container environment 150 in the subsequent booting of an operating system within the container environment 150, the container boot configuration data 240 can specify a new boot device. More specifically, as illustrated by the specification 249 in the system 203 shown in FIG. 2c, the container boot configuration data 240 can specify a composite device, such as the exemplary composite device 250, as a new boot device. The exemplary composite device 250 can implement a layering, analogous to that described above, having a primary layer and a secondary layer. Although described within the context of two layers, namely a primary layer and a secondary layer, a composite device, such as the exemplary composite device 250, can comprise any number of layers, including a tertiary layer below the secondary layer, and so on.

As will be detailed further below, a composite device, such as the exemplary composite device 250, can access multiple devices in a hierarchical order. Thus, for example, a primary device can be accessed first, and, if the information sought is unavailable from the primary device, the secondary device can be accessed, and the information sought and be provided therefrom. Conversely, again, if the information sought is available from the primary device, the secondary device may not need to be accessed. For purposes of implementing the ability for processes executing within a container environment 150 to make changes that can affect the subsequent boot of an operating system within the container environment 150, the exemplary composite device 250 can be a composite of a primary device 251, which, in the present example, can be the sandbox 149, and a secondary device 252, which, in the present example, can be the container host connection 190.

A composite device, such as the exemplary composite device 250, can enable the utilization of a composite file system, such as the exemplary composite file system 260. As described above, a composite file system can layer a primary file system over a secondary file system such that, if a file is found in the primary file system, it can be utilized even if the same file exists in the secondary file system, while, if a file is not found in the primary file system, the secondary file system can be checked and, if found, the file can be sourced therefrom. As with the composite device 250, the composite file system 260 can comprise multiple layers beyond just a primary and secondary file system. For example, the composite file system 260 can comprise a tertiary file system, and so on. Again, for purposes of implementing the ability for processes executing within a container environment 150 to make changes that can affect the subsequent boot of an operating system within the container environment 150, the exemplary composite file system 260 can comprise a primary file system 261, which, in the present example, can be the container file system 171, and a secondary file system 262, which, in the present example, can be the host file system 181.

According to one aspect, a container boot manager, such as the container boot manager 230 from the container operating system image 212 in the host computing environment 110, instantiated into, and executing within, the container environment 150 as the executing container boot manager 231, can comprise computer-executable instructions that can operate with a composite device, such as the exemplary composite device 250, and implement a composite file system, such as the exemplary composite file system 260.

For example, the executing container boot manager 231 can execute drivers, filters, mini-filters, or other like computer executable instructions that can access the sandbox 149. Such computer executable instructions are illustrated in the exemplary system 203, shown in FIG. 2c, as the exemplary drivers 277. According to one aspect, the exemplary drivers 277 can be similar to, or even equivalent to, the drivers ultimately utilized by the container operating system to implement the container file system 171, such as the exemplary drivers 170 illustrated in FIG. 1 and described above. According to another aspect, the exemplary drivers 277 can differ from the exemplary drivers 170 in that they can implement a more rudimentary, simpler functionality that can comprise the device and file system functionality utilized by the container boot manager 231, but can lack support for more complex functions. Again, the exemplary drivers 277 need not be driver code in a traditional sense, but rather can be computer-executable instructions capable of implementing the mechanisms described herein, in whatever form such computer executable instructions are packaged for purposes of convenience and/or interoperation with other aspects of the container environment 150 and/or the host computing environment 110.

Analogously, the executing container boot manager 231 can execute drivers, filters, mini-filters, or other like computer executable instructions that can access the data of the host file system over the container host connection 190. Such computer executable instructions are illustrated in the exemplary system 203, shown in FIG. 2c, as the exemplary drivers 278. According to one aspect, the exemplary drivers 278 can be similar to, or even equivalent to, the drivers ultimately utilized by the container operating system to implement the host file system 181 in the container 150, such as the exemplary drivers 180 illustrated in FIG. 1 and described above. According to another aspect, the exemplary drivers 278 can differ from the exemplary drivers 180 in that they can implement a more rudimentary, simpler functionality that can comprise the device and file system functionality utilized by the container boot manager 231, but can lack support for more complex functions. As before, the exemplary drivers 278 need not be driver code in a traditional sense, but rather can be computer-executable instructions capable of implementing the mechanisms described herein, in whatever form such computer executable instructions are packaged for purposes of convenience and/or interoperation with other aspects of the container environment 150 and/or the host computing environment 110.

According to one aspect, the container boot manager 231 can further comprise computer-executable instructions, such as the exemplary drivers 270, that can provide the device and/or file system aggregation described in further detail below. For example, the computer-executable instructions illustrated in FIG. 2c as the exemplary drivers 270 can comprise a device driver or other like computer-executable instructions that can receive device-centric requests, such as requests to mount a device, open a device, enumerate a device, and other like device-centric requests, and can direct such requests to the computer-executable instructions implementing the interfaces with the devices that are part of the composite device 250, such as the primary device 251 and the secondary device 252. Thus, for example, the drivers 270 can receive a request to mount the composite device 250, and, in response, can direct mount device requests to both the drivers 277, in order to mount the sandbox 149 as a device accessible from within the container environment 150, and the drivers 278, in order to mount the container host connection 190 as a device accessible from within the container environment 150. The drivers 270 can then respond to the mount device request as if a single device was mounted, with the mounting of the individual primary and secondary devices being abstracted in the manner described. In an analogous manner, the computer-executable instructions illustrated in FIG. 2c as the exemplary drivers 270 can comprise one or more file system drivers, filter drivers, mini-filters or other like computer-executable instructions that can receive file-system-centric requests, such as requests to open a file, read from a file write to a file, enumerate the files within a folder, and other like file-system-centric requests, and can direct such requests to the computer-executable instructions implementing the interfaces with the file systems that are part of the composite file system 260, such as the primary file system 261 and the secondary file system 262. Thus, for example, the drivers 270 can receive to open a file in the composite device 260, and, in response, can direct the file open request first to the drivers 277, if the file is part of the container file system 271, or the drivers 278 if the file is not part of the container file system 271, but rather is part of the host file system 181. The drivers 270 can then respond to the open file request as if a single file system was accessed, with the underlying interactions with the primary and secondary file systems being abstracted in the manner described.

Figure 2D:
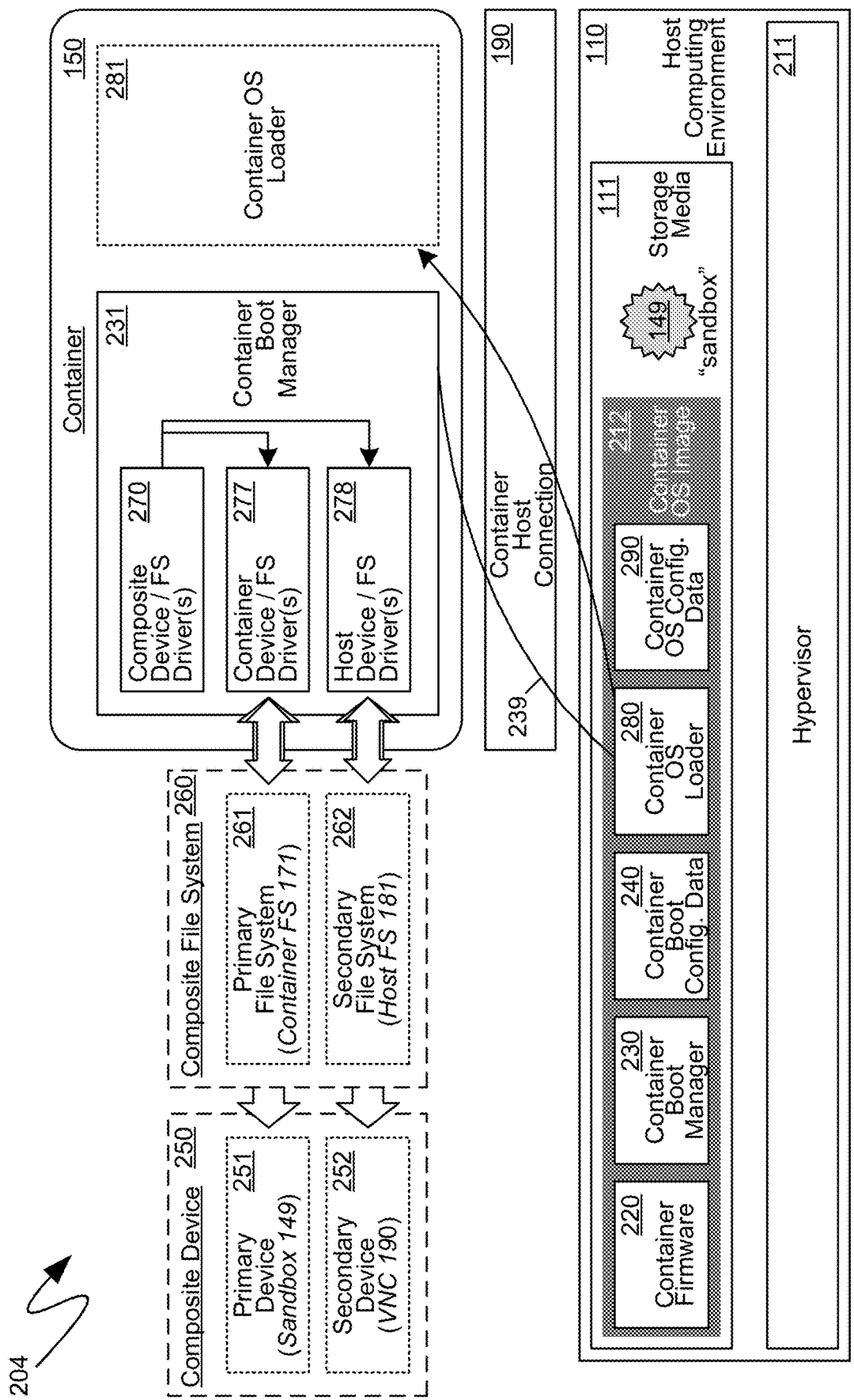

Utilizing the composite device 250 as a new boot device, as specified by the container boot configuration data 240, as illustrated by the specification 249, the container boot manager 231 can locate container operating system loader computer executable instructions, such as the exemplary container operating system loader 280, which can be part of the exemplary container operating system image 212, and can execute such a container operating system loader 280 in the container environment 150. Turning to FIG. 2d, the exemplary system 204 shown therein illustrates an action 239 by which the container boot manager 231 executes the container operating system loader 280 in the container environment 150 as the executing container operating system loader 281.

According to one aspect, the container boot manager 231 can utilize the composite device 250 and the composite file system 260 to locate the container operating system loader 280. In conformance with the specific aspect illustrated by the exemplary system 204, the container operating system loader 280 can have been left unchanged by processes executing within the container 150 and, consequently, can be part of the host file system 181, and not the container file system 171, such as in accordance with the mechanisms described with reference to FIG. 1 above. Accordingly, requests by the container boot manager 231 to open and execute the container operating system loader 280 can be passed through the drivers 278 and the container operating system loader 280 can be obtained, through the container host connection 190, from the container operating system image 212 in the host computing environment 110.

Figure 2E:
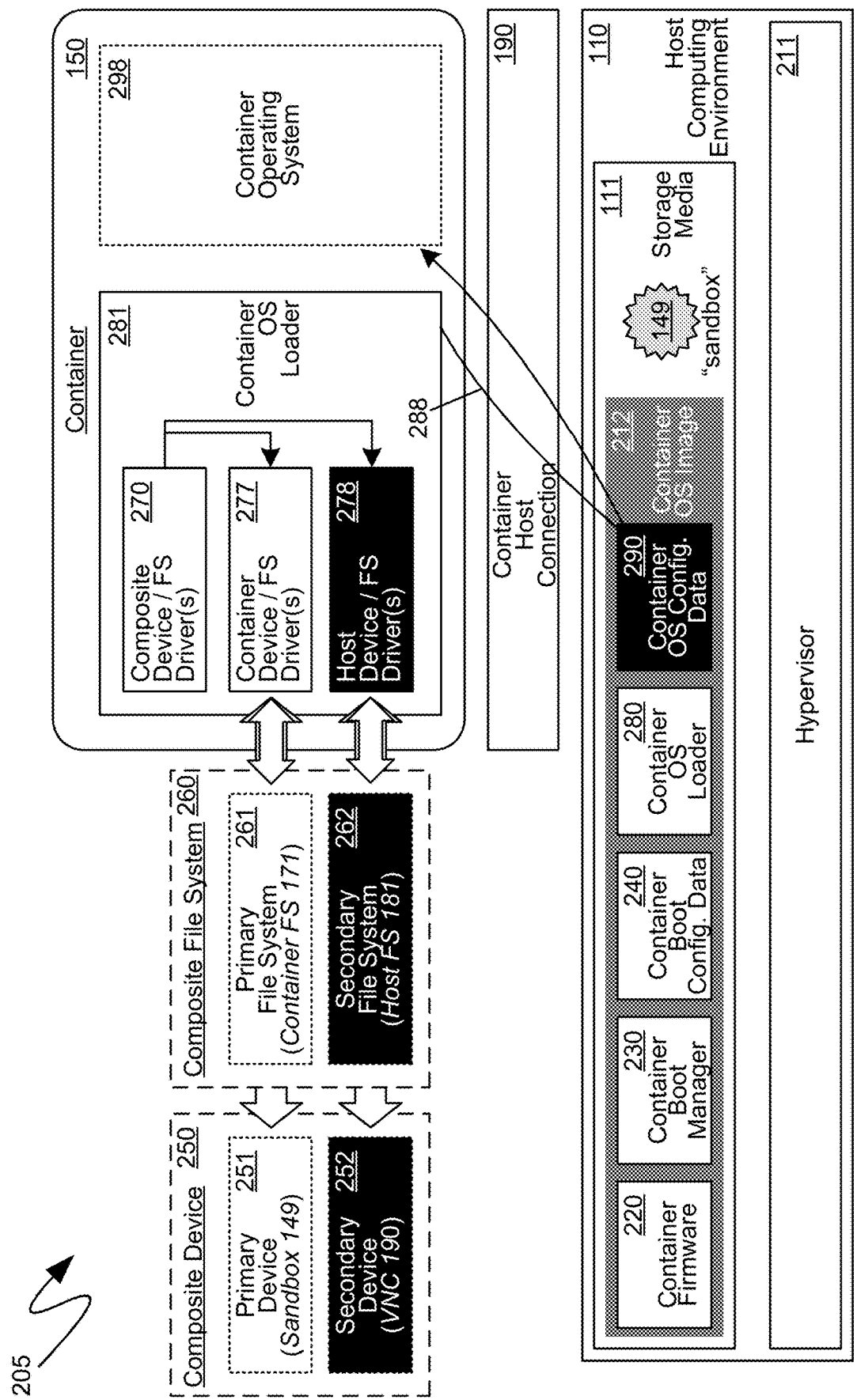

Turning to FIG. 2e, the exemplary system 205 shown therein illustrates an exemplary operation of the container operating system loader 281 as executing within the container environment 150. According to one aspect, the container operating system loader 281 can open the composite device 250, and access the composite file system 260 in order to and locate configuration data for the container operating system that the container operating system loader 281 is to boot into the container environment 150, such as the exemplary container operating system 298. The exemplary system 205 shown in FIG. 2e illustrates an exemplary operation if the container operating system configuration was not changed by processes executing within the container 150. More specifically, if the container operating system configuration was not previously changed by processes executing within the container 150, then, when the container operating system loader 281 attempts to access the container operating system configuration data, no such modified data can be found in the primary file system 261, such as, for example the container file system 171 that contains files that have been changed by processes executing within the container environment 150, such as in the manner described above with reference to FIG. 1. Accordingly, the container operating system loader 281 can, instead, find the container operating system configuration data through the secondary file system 262, such as, for example, the host file system 181. As shown in the exemplary system 205, therefore, action 288, by the container operating system loader 281, obtains the container operating system configuration data 290, from the operating system container image 212 in the host computing environment 110, and utilizes such container operating system configuration data 290 to configure the booting of the container operating system 298. Because the container operating system configuration data 290 was obtained from the host file system 181, the composite device 250 can have provided the relevant access via the secondary device 252, the composite file system 260 can have provided the relevant access via the secondary file system 262, and the drivers 278, responsible for the secondary device 252 and the secondary file system 262, can have been utilized by the container operating system loader 281 to obtain the container operating system configuration data 290 from the host file system 181 and utilize the same to boot the container operating system 298 in the container environment 150, as illustrated by the black highlighting.

By contrast, if one or more processes executing within the container environment 150 had previously changed part of the operating system configuration data, a copy of the container operating system configuration data 290 can be part of the container file system 171, such as can be stored, or otherwise retained, in the sandbox 149. As indicated previously, existing mechanisms would not have provided access to the container file system 171 until after the container operating system 298 had completed booting, because the relevant computer-executable instructions, such as the relevant drivers, can be loaded by the booting of the container operating system 298 and can be unavailable prior to such booting, rendering the container file system 171 inaccessible until after the container operating system 298 has completed booting. However, utilizing the mechanisms described herein, access to the container file system 171, such as for purposes of accessing a modified copy of the container operating system configuration data 290, reflecting modifications made by processes executing within the container environment 150, can be provided at an earlier stage of the boot process, more specifically, prior to the container operating system loader 281 utilizing such operations and configuration data to boot and configure the container operating system 298.

Figure 2F:
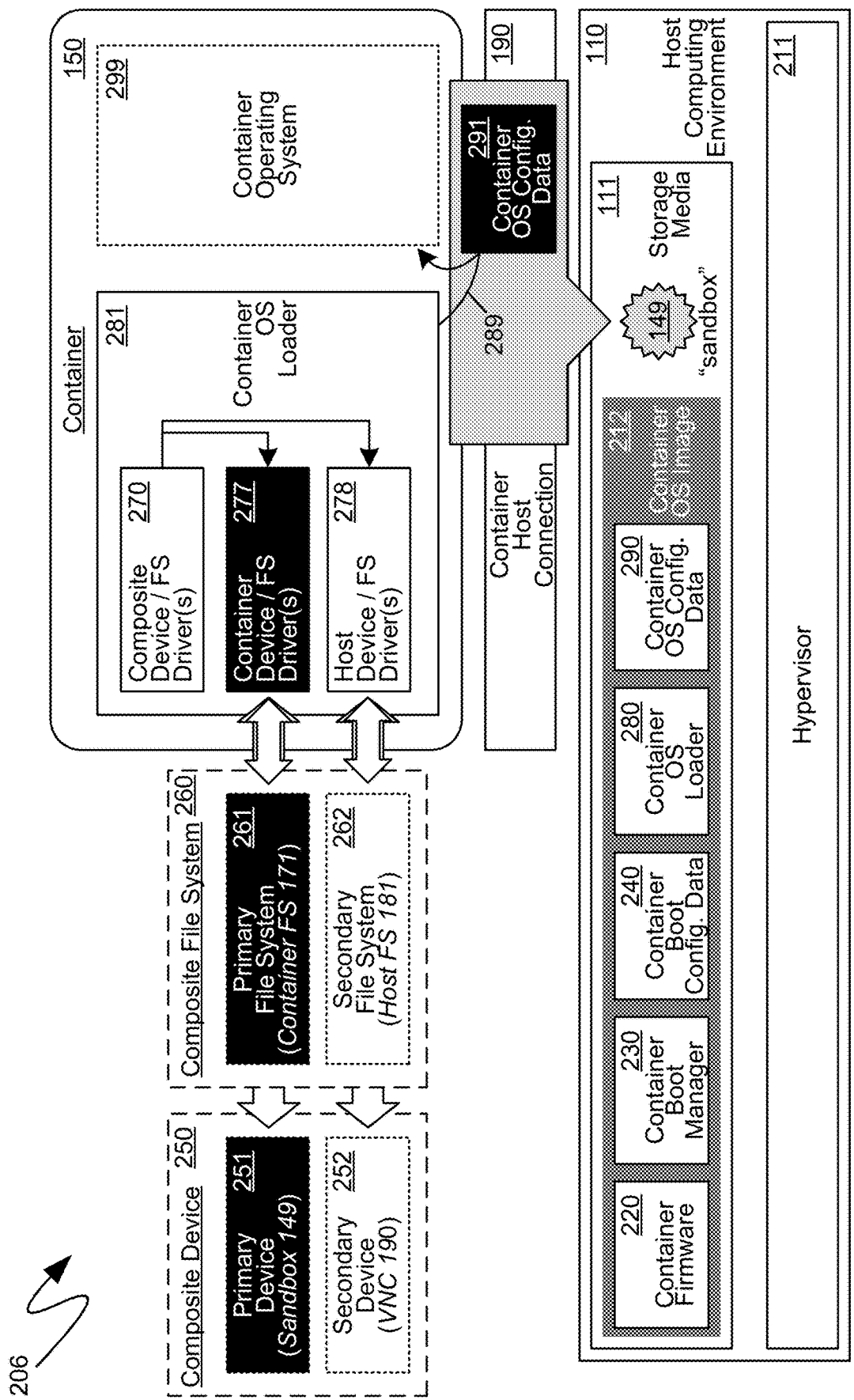

More specifically, and with reference to FIG. 2f, the exemplary system 206 shown therein illustrates an exemplary operation by which container operating system configuration data 291, reflecting changes previously made by processes executing within the container environment 150, can be utilized to control the configuration and booting of the container operating system 299. The container operating system 299 is labeled with a different identifier than the container operating system 298 of the system 205 shown in FIG. 2e to indicate that the executing operating systems can have different configurations. The container operating system configuration data 291, having been changed by processes executing within the container environment 150, can be stored within the container file system 171, as persisted in the sandbox 149. Accordingly, the container operating system loader 281 can find the container operating system configuration data 291 through the primary file system 261, such as, for example, the container file system 171. As shown in the exemplary system 206, therefore, action 289, by the container operating system loader 281, can obtain the container operating system configuration data 291, from the sandbox 149, and can utilize such container operating system configuration data 291 to configure the booting of the container operating system 298. Because the container operating system configuration data 291 was obtained from the container file system 171, the composite device 250 can have provided the relevant access via the primary device 251, the composite file system 260 can have provided the relevant access via the primary file system 261, and the drivers 277, responsible for the secondary device 252 and the secondary file system 262, can have been utilized by the container operating system loader 281 to obtain the container operating system configuration data 291 from the sandbox 149 and utilize the same to boot the container operating system 299 in the container environment 150, as illustrated by the black highlighting in FIG. 2f.

In such a manner, changes made by processes executing within the container 150 can be accessible sufficiently early in the boot process to change the configuration of the container operating system booted within the container environment 150. For example, and with reference back to the exemplary system 100 of FIG. 1, if the application 152, executing within the container environment 150, was, for example, and anti-malware program, such an application 152 may need to have computer-executable instructions executed during an early stage of the operating system boot in order to detect potential malware threats occurring during the operating system boot. Accordingly, the application 152 can modify a file 141, such as illustrated by the action 155, where, in the present example, such a file 141 can be an operating system configuration file, and the modification 155 can be the insertion of a path to the computer-executable instructions that are to be executed during an early stage of the operating system boot, together with the insertion of an instruction to execute such computer-executable instructions, for example. The resulting modification to the file 141 can result in a copy of the file 144, with such modifications, existing within the container file system 171, such as, for example, persisted within the sandbox 149, while the file 141 on the host file system 131 remains unchanged. With reference back to the exemplary system 206 shown in FIG. 2f, the exemplary container operating system configuration data 290 can remain unchanged within the host computing environment 110, and the modifications described in the above example can, instead, be reflected in the container operating system configuration data 291, which can be part of the container file system 171, and can be persisted in the sandbox 149.

Upon execution, having been informed of the composite device 250 to utilize as the boot device by the container boot manager, such as in the manner detailed previously, the container operating system loader 281 can access the composite device 250 and search the composite device 250 for container operating system configuration data. As will be detailed further below, the primary device 251, such as the sandbox 149 in the present example, and the corresponding primary file system 261, such as the container file system 171 in the present example, can be referenced first to determine whether the container operating system configuration data exists therein. Such a referencing can identify the container operating system configuration data 291, comprising the modifications made by the application within the container process 150, such as those detailed above in the present example. Consequently, the container operating system loader 281 can boot the container operating system 299, as illustrated by the action 289, utilizing the modified container operating system configuration data 291.

According to one aspect, a slight modification can accommodate changes, not just to the container operating system configuration data, but to the container boot configuration data itself. More specifically, and turning back to the exemplary system 203 shown in FIG. 2c, as indicated previously, the container boot configuration data 240 can comprise an indicator 249 of the composite device 250 to be utilized as the new boot device, since the container boot manager process 231 can initially have been executed utilizing the container host connection 190 as the boot device, such as detailed previously. According to the presently described aspect, the container boot manager 231 can detect when the boot device specified by the container boot configuration data 240 differs from the boot device utilized by the container boot manager 231 to read the container boot configuration data 240 in the first place. For example, the container boot manager 231 can compare identifiers of the boot device specified by the container boot configuration data 240 and the boot device utilized by the container boot manager 231 to read the container boot configuration data 240 in the first place. Such identifiers can be based on the device type and/or the entire device descriptor. In the case of composite devices, such as the exemplary composite device 250, the identifier of such composite devices can be based on the device types and descriptors of the devices abstracted by the composite device. According to one aspect, device descriptors can, in turn, include metadata of the corresponding devices, such as interface identifiers, channel identifiers, disk identifiers, partition identifiers and the like. When such a difference between devices is detected, the container boot manager 231 can utilize the newly specified device, such as, in the present example, the composite device 250, to locate and read the container boot configuration data again.

Figure 3:
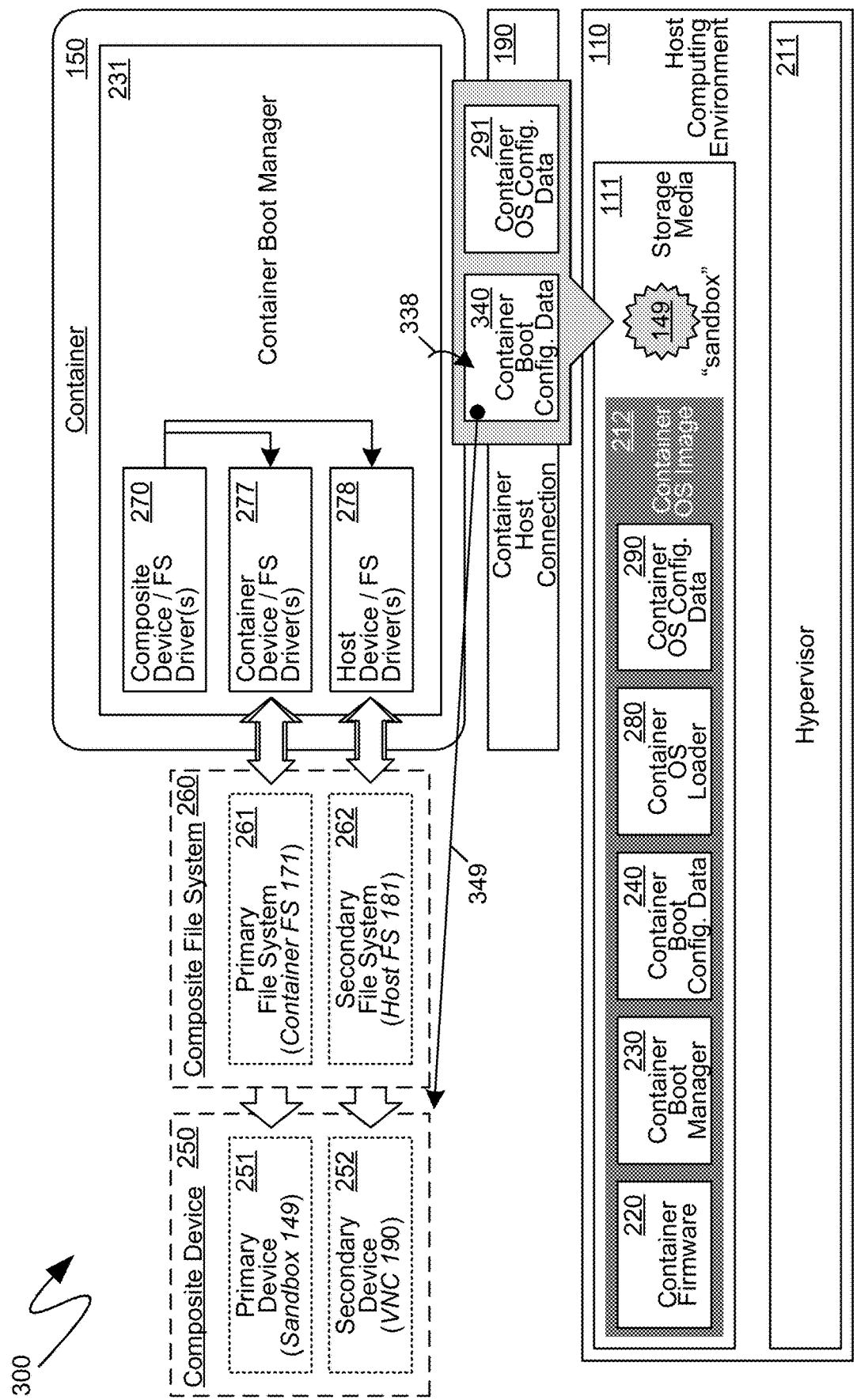
FIG. 3 is a system diagram of an aspect of an exemplary operating system booting in a file system virtualization environment utilizing a layered composite boot device and file system.

More specifically, and turning to the exemplary system 300 shown in FIG. 3, upon detecting that the container boot configuration data 240 specifies a different boot device, namely the composite device 250, the container boot manager 231 can utilize the composite device 250 to again open the container boot configuration data. If the container boot configuration data had been modified, then, in accordance with the mechanisms detailed previously, a new copy of the container boot configuration data, such as the exemplary copy of the container boot configuration data 340, reflecting such modifications, can be part of the container file system 171 such as persisted in the sandbox 149. The container boot manager 231 can be provided with an enumeration of the container boot configuration data 340 from the primary file system 261, rather than the container boot configuration data 240 from the secondary file system 262. Accordingly, the container boot manager 231 can read the container boot configuration data 340, from the container file system 171, is illustrated by the action 338. In the exemplary system 300 shown in FIG. 3, the container boot configuration data 340 can also specify the composite device 250 as the boot device, as illustrated by the specification 349. Accordingly, since the boot device specified by the container boot configuration data 340 is the same, namely the composite device 250, as that utilized by the container boot manager 231 to read the container boot configuration data, the container boot manager 231 can proceed, such as in the manner detailed above, except that the configuration utilized by the container boot manager 231 can be in accordance with the modifications made from within the container environment 150, as reflected in the container boot configuration data 340, as opposed to the container boot configuration data 240, which can remain unchanged on the host computing environment 110, thereby maintaining the isolation of the host computing environment 110 from the container environment 150.

Figure 4:
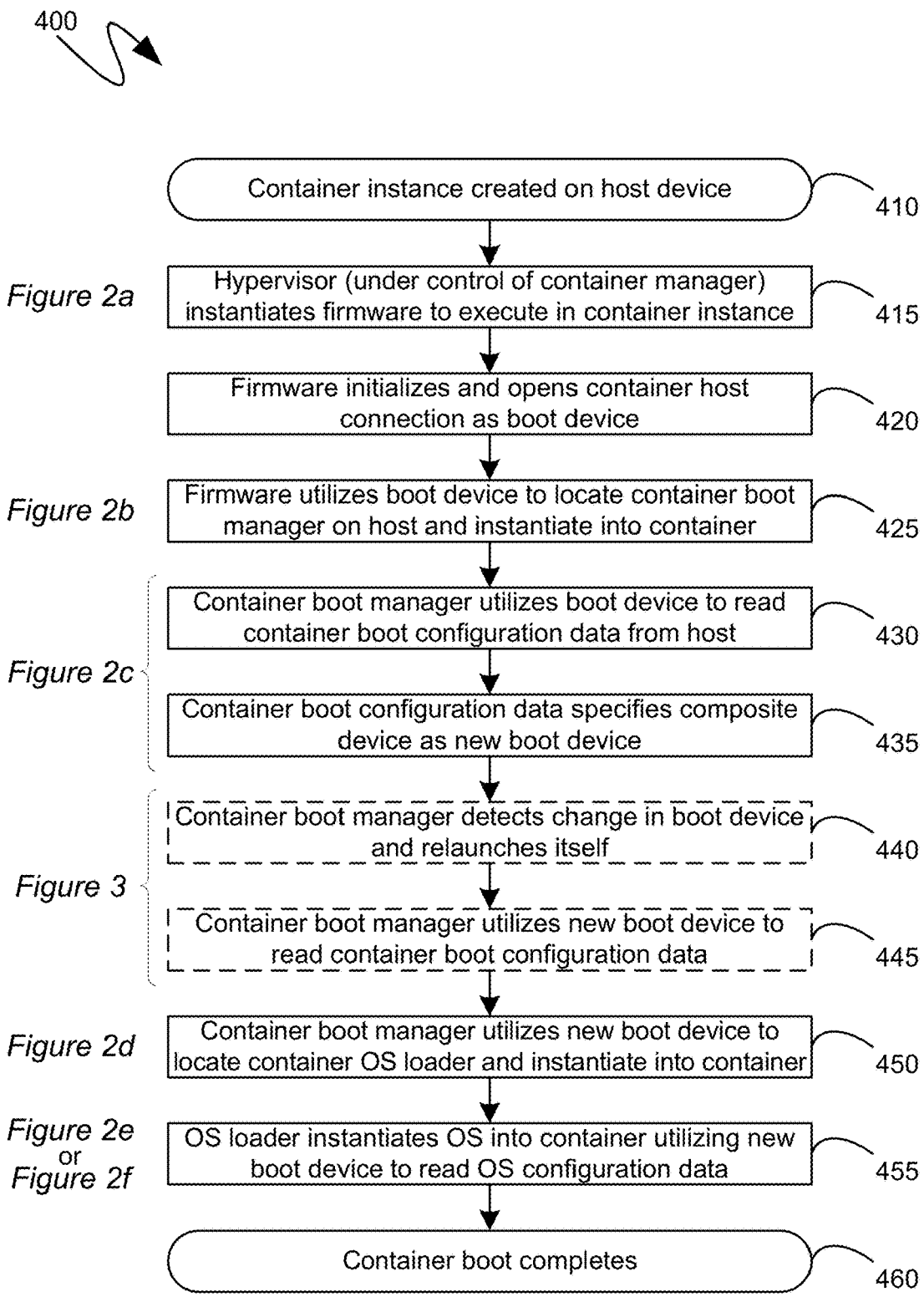
FIG. 4 is a flow diagram of an exemplary operating system booting in a file system virtualization environment utilizing a layered composite boot device and file system.

Turning to FIG. 4, exemplary flow diagram 400 shown therein illustrates an exemplary series of steps that can enable processes executing within a container file system virtualization environment to make modifications that can be implemented during early stages of the operating system boot within such a container file system virtualization environment. Initially, at step 410, a container instance can be created on a host computing device. Such a creation of a container instance can include the reservation of memory, the establishment of underlying hardware and communication functionality, and the like. Subsequently, at step 415, a hypervisor, such as based on instructions and/or parameters provided by container manager processes, can instantiate firmware to execute within the container instance. As indicated in FIG. 4, step 415 can correspond to the exemplary system 201 shown in FIG. 2a and described in detail above.

At step 420, the firmware executing within the container instance created at step 410 can initialize and open a container host connection that can have been identified as part of the instantiation of the firmware, by the hypervisor, at step 415, as the boot device to be utilized by the firmware. At step 425, the firmware can utilize the boot device, namely the container host connection, to locate a container boot manager, such as from the host computing environment, and instantiate the container boot manager into the container instance created at step 410. The instantiation of the container boot manager, by the firmware, at step 425, can include the passing of parameters from the firmware to the container boot manager. For example, the parameters can be provided from the firmware to the container boot manager in the form of pointers to values, command line parameters provided as part of an execution instruction implemented by the container boot manager, or other like passing of parameters into a process being instantiated. Such parameters can include a specification of the boot device, which, in the present example, can still be the container host connection. As indicated in FIG. 4, step 425 can correspond to the exemplary system 202 shown in FIG. 2b and described in detail above.

At step 430, the container boot manager can utilize the identified boot device, passed in as a parameter by the firmware at step 425, to find, open and read container boot configuration data. In the present example, at step 430, such container boot configuration data will be read through the container host connection. At step 435, as part of the reading of the container boot configuration data, the container boot configuration data can include a specification of a new boot device, namely the composite device detailed above. As indicated in FIG. 4, steps 430 and 435 can correspond to the exemplary system 203 shown in FIG. 2c and described in detail above. Optionally, at step 440, the container boot manager can detect that the boot device specified by the container boot configuration data read at step 435 differs from the boot device utilized by the container boot manager to read the container boot configuration data in the first place at step 430. Step 440 is illustrated in FIG. 4 utilizing dashed lines to indicate that it is an optional step. Also optionally, at step 445, upon determining, at step 440, that the boot device specified by the container boot configuration data differs from that utilized to read the container boot configuration data in the first place, the container boot manager can utilize the newly specified boot device and again read the container boot configuration data, at step 445, this time from such a newly specified boot device. As detailed above, such a step 445 can enable container boot configuration data that can have been modified by processes executing within the container to be utilized during the boot process. Like step 440, step 445 is also illustrated in FIG. 4 utilizing dashed lines to indicate that it is optional. As indicated in FIG. 4, steps 440 and 445 can correspond to the exemplary system 300 shown in FIG. 3 and described in detail above.

Subsequent to step 445, if performed, or step 435, if the aspect represented by steps 440 and 445 is not utilized, processing can proceed to step 450 and the container boot manager can utilize the new boot device specified at step 435, namely the composite device in the present example, to locate and instantiate a container operating system loader into the container instance created in step 410. At step 450, the container operating system loader can be obtained from the host computing device, if no changes were made to the operating system loader within the container environment. More specifically, the utilization of the new boot device, being a composite device, can first check a primary device, and a primary file system, for the container operating system loader. As detailed above, such a primary device, and primary file system, can be associated with the container environment in order to find any modified copies of the container operating system loader. If the container operating system loader was unmodified, then a secondary device and a secondary file system, such as associated with the host computing device, can be utilized and the container operating system loader can be instantiated, at step 450, from there. As indicated in FIG. 4, step 450 can correspond to the exemplary system 204 shown in FIG. 2*d* and described in detail above.

Once instantiated into the container instance, and executing therefrom, the operating system loader can proceed to find and read operating system configuration data from the boot device, which, in the present example, can be the composite device specified by the container boot configuration data at step 435. At step 455, therefore, if the operating system configuration data was modified, a primary device, and a primary file system, associated with the container environment, can be utilized to provide access to the modified operating system configuration data, and the operating system loader can utilize such modified operating system configuration data to boot the operating system. In such a manner, processes executing within a container environment can modify the booting of the operating system of such a container environment. Conversely, if the operating system configuration data was not modified, a secondary device, and a secondary file system, associated with the host computing environment, can be utilized to provide access to the unmodified operating system configuration data and, at step 555, the operating system loader can utilize such unmodified operating system configuration data to boot the operating system. The booting of an operating system into the container environment can then complete at step 460.

Figure 5:
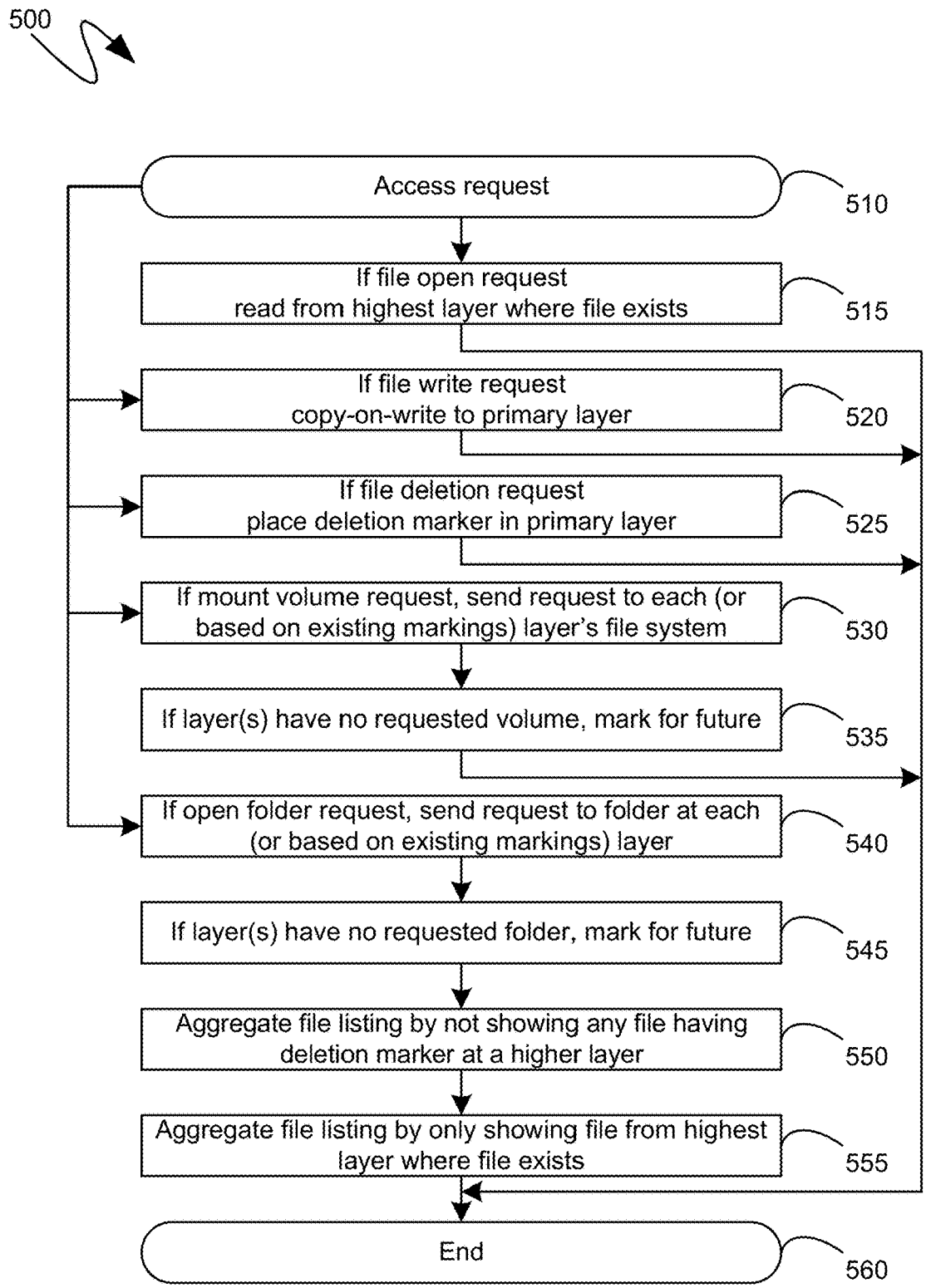
FIG. 5 is a flow diagram of an operation of an exemplary composite boot device and file system.

Turning to FIG. 5, the exemplary flow diagram 500 shown therein illustrates an exemplary series of steps by which the composite device and the composite file system can be implemented to provide the above described layering. Initially, at step 510, an access request can be received. Such an access request can be a file-based access request, a folder-based or directory-based access request, or a device-based access request. Although only select access requests are illustrated and described, other corresponding access requests can proceed among the multiple layers of the composite device and composite file system in an analogous manner to those illustrated and described. For example, device-based access requests that can be directed to a composite device include traditional device-based requests, such as requests to open the device, initialize the device, read from the device, write to the device, mount the device, unmount the device, and the like. Analogous files-based or directory-based requests can be directed to files and/or directories of the composite file system.

Turning back to the exemplary flow diagram 500, if the access request is a file open request, then, at step 515, the requested file can be read from the highest layer where the file exists. Thus, for example, if the file exists in the primary file system, that file can be provided in response to the request received at step 510. Conversely, if the file does not exist in the primary file system, the secondary file system can be checked for the file, and if the file is located in the secondary file system, it can be provided from there in response to the request. According to one aspect, metadata, such as in the form of a flag or other like indicator, can be generated to identify the file system where the file was located, such that subsequent requests for the same file can be directed to the identified file system, with the other file systems being skipped. Such metadata can be cached in one or more tables, such as file tables implemented by the composite file system, or other analogous databases or data structures. Subsequently, the relevant processing can end at step 560.

If the access request is a file write request, then, if the file is not already in the primary file system, a copy-on-write can be performed to copy the file from the secondary file system into the primary file system and then persist the changes being written to the file in the primary file system, thereby maintaining isolation between the container environment, having access to the primary file system, and the host computing environment, having access to the secondary file system, where the unchanged file can remain. Subsequently, the relevant processing can end at step 560.

If the access request is a file deletion request, received from processes executing within the container environment, then a deletion marker can be placed in the primary file system, at step 525. According to one aspect, when a file deletion marker is encountered at any layer, the composite file system returns an indication that the file is no longer available. Subsequently, the relevant processing can end at step 560.

If the access request is a device-based request, such as a request to mount a volume, processing can proceed to step 530 and the composite device can send such a request to each layer's file system. In such a manner, the relevant volume can be mounted at each layer such that subsequent directory enumerations, or file access requests can encompass both an underlying base layer provided by the host computing environment, which is not changeable from the container environment, and a primary, or overlay, layer accessible from within the container environment and persisting changes made within the container environment. According to one aspect, if, at step 535, it is determined that one or more layers do not have the requested volume, then metadata, such as in the form of a flag or other like indicator, can be generated to identify the layers where the volume is accessible, or, conversely, to identify the layers were the volume is not accessible. Subsequent performance of the step 530 can then send the request only to those layers at which the volume is accessible, based on existing, previously generated markings. Subsequently, the relevant processing can end at step 560.

If the access request is a directory-based access request, such as a request to enumerate the files within a folder, or otherwise open a folder, processing can proceed with step 540, at which point the request can be sent to each layer's file system. As before, if, at step 545, it is determined that one or more layers do not have the requested folder, then metadata, such as in the form of a flag or other like indicator, can be generated to identify the layers that do not have such a folder, or, conversely, to identify the layers having such a folder. Subsequent iterations of step 540 can then direct the open folder request, for example, only to those layers that have the folder, based on the existing markings, such as from prior performance of step 545. Once the files in the folder are enumerated at every layer, or, more specifically, every layer having such a folder, the presented listing of files can be in accordance with the priority of the layers. More specifically, and as detailed above, if the file exists in a higher layer, the same file from a lower layer is not shown. Thus, for example, if a modified copy of the file, modified from within a container environment, and therefore saved in the primary file system, namely the container file system, exists, then the unmodified file, from the host environment, they can be part of the secondary file system, can be not shown, and an enumeration of the files in the folder can include only the modified copy of the file from the primary file system. Such an aggregation can be performed at step 555. Additionally, such as at step 550, any file corresponding to a deletion marker at a higher layer can be indicated as no longer available, and, therefore, not presented as part of the enumeration of files in a folder. Deletion markers can also be utilized for folders, with a folder corresponding to a deletion marker at a higher layer causing the aggregation, at step 555, to not present any files that are present in that folder at lower layers. Upon completion of steps 550 and 555, the relevant processing can end at step 560.

Figure 6:
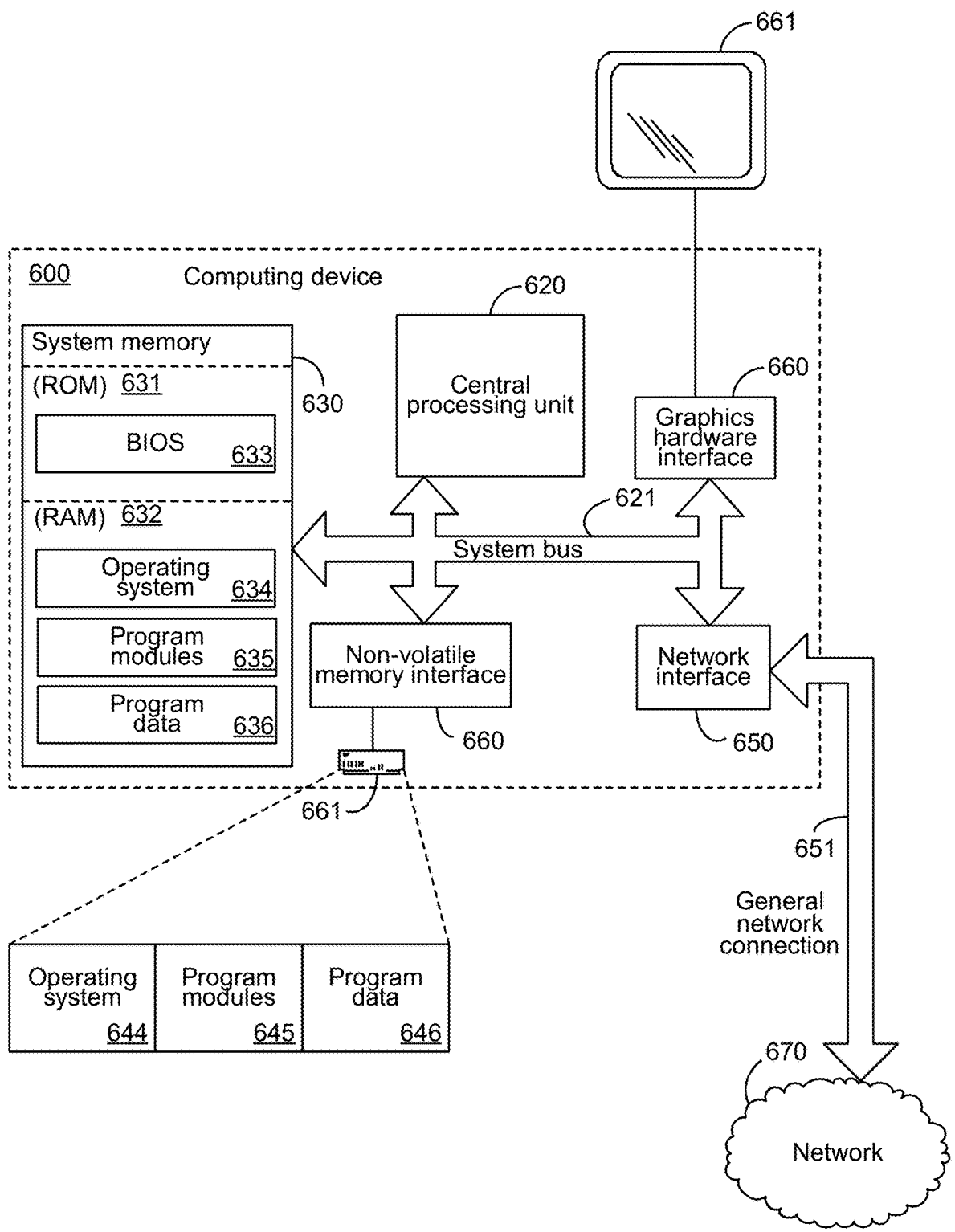
FIG. 6 is a block diagram of an exemplary computing device.

Turning to FIG. 6, an exemplary computing device 600 is illustrated which can perform some or all of the mechanisms and actions described above. The exemplary computing device 600 can include, but is not limited to, one or more central processing units (CPUs) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, including, but not limited to, a graphics hardware interface 660 and a display device 661, which can include display devices capable of receiving touch-based user input, such as a touch-sensitive, or multi-touch capable, display device. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 600. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer content between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, other program modules 635, and program data 636.

The computing device 600 may also include other removable/non-removable, volatile/nonvolatile computer storage media. By way of example only, FIG. 6 illustrates a hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 641 is typically connected to the system bus 621 through a non-volatile memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 may operate in a networked environment using logical connections to one or more remote computers. The computing device 600 is illustrated as being connected to the general network connection 651 (to the network 670) through a network interface or adapter 650, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

Although described as a single physical device, the exemplary computing device 600 can be a virtual computing device, in which case the functionality of the above-described physical components, such as the CPU 620, the system memory 630, the network interface 640, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 600 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device comprising: one or more processing units; and one or more computer-readable storage media comprising: a first computer-executable instructions, which, when executed by the processing units, cause the computing device to: host a container providing a file system virtualization environment isolated from a host file system of the computing device; and a container operating system image comprising: a container boot manager, a first container boot configuration data, a container operating system loader, and a first container operating system configuration data; wherein the container boot manager comprises a second computer-executable instructions, which, when executed by the processing units, cause the computing device to: read the first container boot configuration data from the container operating system image via a container host connection that appears, from within the container, as a device; receive, from the reading of the first container boot configuration data, a specification of a composite device as a boot device, the composite device abstracting a first device as a primary layer of the composite device and a second device as a secondary layer of the composite device; and identify the composite device as the boot device to the container operating system loader; and wherein the container operating system loader comprises a third computer-executable instructions, which, when executed by the processing units, cause the computing device to: receive the identification of the composite device as the boot device; read an obtained container operating system configuration data from the composite device; and utilize the obtained operating system configuration data to boot an operating system in the container.

A second example is the computing device of the first example, wherein the container operating system image further comprises a container firmware.

A third example is the computing device of the second example, wherein the first computer-executable instructions further cause the computing device to: utilize a hypervisor of the computing device to execute the container firmware in the container.

A fourth example is the computing device of the first example, wherein the container host connection appears, from within the container, as a network connection.

A fifth example is the computing device of the first example, wherein the second computer-executable instructions further cause the computing device to: receive an identification of the container host connection as the boot device; determine that the composite device differs from the container host connection; and in response to the determination that the identified boot device changed, reading container boot configuration data from the composite device; wherein the receiving the specification of the composite device as the boot device occurs subsequent to the receiving the identification of the container host connection as the boot device.

A sixth example is the computing device of the fifth example, wherein the determining that the composite device differs from the container host connection comprises comparing device identifiers, the device identifier of the composite device being based on device identifiers of the first and second devices abstracted by the composite device.

A seventh example is the computing device of the fifth example, wherein the reading the container boot configuration data from the composite device comprises reading the first container boot configuration data again from the container operating system image.

An eighth example is the computing device of the fifth example, wherein the reading the container boot configuration data from the composite device comprises reading a second container boot configuration data from a sandbox comprising file activity from within the container that is isolated from the host file system of the computing device.

A ninth example is the computing device of the first example, wherein the reading the obtained container operating system configuration data from the composite device comprises reading the first container operating system configuration data from the container operating system image.

A tenth example is the computing device of the first example, wherein the reading the obtained container operating system configuration data from the composite device comprises reading a second container operating system configuration data from a sandbox comprising file activity from within the container that is isolated from the host file system of the computing device.

An eleventh example is the computing device of the first example, wherein the first device abstracted by the composite device is a sandbox comprising file activity from within the container that is isolated from the host file system of the computing device and the second device abstracted by the composite device is the container host connection.

A twelfth example is the computing device of the first example, wherein the composite device is associated with a composite file system abstracting, as a primary layer, a first file system providing access to data persisted on the first device and, as a secondary layer, a second file system providing access to data persisted on the second device.

A thirteenth example is the method of booting an operating system in a container providing a file system virtualization environment isolated from a host computing environment hosting the container, the method comprising: receiving a specification of a composite device as a boot device, the composite device abstracting a first device as a primary layer of the composite device and a second device as a secondary layer of the composite device; reading, in response to the receipt of the specification of the composite device as the boot device, operating system configuration data from a composite file system associated with the composite device, the composite file system abstracting, as a primary layer of the composite file system, a first file system providing access to data persisted on the first device and, as a secondary layer of the composite file system, a second file system providing access to data persisted on the second device; and utilizing the read operating system configuration data to boot the operating system in the container; wherein the read operating system configuration data was read from the first file system file system based upon the operating system configuration data being found in the first file system; and wherein the read operating system configuration data was read from the second file system file system based upon the operating system configuration data not being found in the first file system.

A fourteenth example is a method of the thirteenth example, wherein the first file system is at least a part of the file system virtualization environment of the container such that edits made from within the container are accessible through the first file system and are isolated from, and not accessible through, the second file system.

A fifteenth example is the method of the thirteenth example, further comprising: receiving a specification of the second device as an initial boot device; and reading boot configuration data from the second file system based on the received specification of the second device as the initial boot device; wherein the receiving the specification of the composite device as the boot device occurs from the reading of the boot configuration data.

A sixteenth example the method of the fifteenth example, further comprising: reading the boot configuration data from the composite file system in response to determining that the reading the boot configuration data from the second file system resulted in the receiving the specification of a different boot device.

A seventeenth example is the method of the thirteenth example, further comprising: directing a volume mount request for an identified volume to the composite device; passing the volume mount request to devices at each layer of the composite device in the absence of existing metadata indicating that one or more layers of the composite device lack the identified volume; and passing the volume mount request to devices at only those layers of the composite device indicated by the existing metadata as having the identified volume.

An eighteenth example is the method of the thirteenth example, further comprising: directing a folder open request for an identified folder to the composite file system; passing the folder open request to file systems at each layer of the composite file system in the absence of existing metadata indicating that one or more layers of the composite file system lack the identified folder; passing the folder open request to file systems at only those layers of the composite file system indicated by the existing metadata as having the identified folder; and generating a file listing for the identified folder comprising, for a first file found in the identified folder at multiple layers of the composite file system, only a single instance of the first file from the highest layer where the first file was found.

A nineteenth example is the method of the eighteenth example, wherein the generating the file listing comprises excluding a second file found in the identified folder at a first layer of the composite file system if a file deletion marker corresponding to the second file exists at a higher layer than the first layer.

A twentieth example is one or more computer-readable storage media comprising computer-executable instructions, which, when executed, perform steps comprising: receiving a specification of a composite device as a boot device, the composite device abstracting a first device as a primary layer of the composite device and a second device as a secondary layer of the composite device; reading, in response to the receipt of the specification of the composite device as the boot device, operating system configuration data from a composite file system associated with the composite device, the composite file system abstracting, as a primary layer of the composite file system, a first file system providing access to data persisted on the first device and, as a secondary layer of the composite file system, a second file system providing access to data persisted on the second device; and utilizing the read operating system configuration data to boot the operating system in the container; wherein the read operating system configuration data was read from the first file system file system based upon the operating system configuration data being found in the first file system; and wherein the read operating system configuration data was read from the second file system file system based upon the operating system configuration data not being found in the first file system.

As can be seen from the above descriptions, mechanisms for providing a layered composite boot device and file system for operating system booting in file system virtualization environments have been presented. In view of the many possible variations of the subject matter described herein, we claim as our invention all such embodiments as may come within the scope of the following claims and equivalents thereto.

We claim:

1. A method comprising:
opening a container host connection as an initial boot device;
receiving a specification of a composite device as a current boot device;
determining the container host connection is different from the composite device;
reading operating system configuration data from a composite file system associated with the composite device, the composite file system abstracting:
a first file system comprising data persisted on a first device, the first device being abstracted as a primary layer of the composite device; and
a second file system comprising data persisted on a second device, the second device being abstracted as a secondary layer of the composite device; and
using the operating system configuration data to boot an operating system in a container providing a virtualization environment isolated from a host computing environment hosting the container.

2. The method of claim 1, further comprising:
prior to reading the operating system configuration data from the composite file system, using a hypervisor to instantiate firmware to execute within the container.

3. The method of claim 2, wherein the firmware is used to open the container host connection as the initial boot device to be used by the firmware.

4. The method of claim 3, wherein the firmware uses the initial boot device to:
locate a container boot manager in the host computing environment; and
instantiate the container boot manager into the container.

5. The method of claim 4, wherein instantiating the container boot manager into the container comprises passing parameters from the firmware to the container boot manager, the parameters corresponding to at least one of:
pointers to values; or
command line parameters provided as part of an execution instruction implemented by the container boot manager.

6. The method of claim 5, wherein the parameters include a specification of the container host connection as the second device.

7. The method of claim 5, wherein the container boot manager locates and reads container boot configuration data via the container host connection, the container boot configuration data comprising the specification of the composite device as the current boot device.

8. The method of claim 1, wherein the operating system configuration data is read from the first file system based on the operating system configuration data being found in the first file system.

9. The method of claim 1, wherein the operating system configuration data is read from the second file system based on the operating system configuration data not being found in the first file system.

10. The method of claim 1, wherein the current boot device is associated with an identifier that is based on at least one of a device type or a device descriptor.

11. The method of claim 10, wherein the device descriptor includes metadata comprising at least one of:
   interface identifiers;
   channel identifiers;
   disk identifiers; or
   partition identifiers.

12. A system comprising:
   memory comprising computer executable instructions that, when executed, perform operations comprising:
      opening a container host connection as an initial boot device;
      determining the container host connection is different from a composite device that is a current boot device;
      reading operating system configuration data from a composite file system associated with the composite device, the composite file system abstracting:
         a first file system comprising data persisted on a first device, the first device being abstracted as a primary layer of the composite device; and
         a second file system comprising data persisted on a second device, the second device being abstracted as a secondary layer of the composite device; and
      using the operating system configuration data to boot an operating system in a container providing a virtualization environment isolated from a host computing environment hosting the container.

13. The system of claim 12, the operations further comprising:
   receiving a specification of the second device as the initial boot device; and
   reading boot configuration data from the second file system based on the specification of the second device as the initial boot device.

14. The system of claim 12, wherein determining that the container host connection is different from the composite device comprises comparing a device identifier of the first device to a device identifier of the second device.

15. The system of claim 12, wherein edits made from within the container are accessible through the first file system and are not accessible through the second file system.

16. The system of claim 12, wherein the first device or the second device is a sandbox comprising file activity within the container.

17. The system of claim 12, wherein the operating system configuration data is read from the second file system based on the operating system configuration data being found in the second file system and not being found in the first file system.

18. A device comprising:
   a processing system;
   memory coupled to the processing system, the memory comprising computer executable instructions that, when executed by the processing system, perform operations comprising:
      opening a container host connection as an initial boot device;
      determining the container host connection is different from a composite device that is a current boot device;
      accessing configuration data from a composite file system associated with the composite device, the composite file system abstracting:
         a first file system comprising data persisted on a first device, the first device being abstracted as a primary layer of the composite device; and
         a second file system comprising data persisted on a second device, the second device being abstracted as a secondary layer of the composite device; and
      using the configuration data to boot an operating system in a virtualization environment isolated from a host computing environment hosting the virtualization environment.

19. The device of claim 18, the operations further comprising:
   using a hypervisor to instantiate firmware to execute within the virtualization environment, the firmware being used to open the container host connection as the initial boot device to be used by the firmware.

20. The device of claim 18, wherein the current boot device is associated with an identifier that is based on at least one of a device type or a device descriptor.

\* \* \* \* \*